(12) United States Patent
Lin et al.

(10) Patent No.: US 11,681,153 B2
(45) Date of Patent: Jun. 20, 2023

(54) ANTIREFLECTION COATINGS FOR METASURFACES

(71) Applicant: Magic Leap, Inc., Plantation, FL (US)

(72) Inventors: Dianmin Lin, Los Altos, CA (US); Michael Anthony Klug, Austin, TX (US); Pierre St. Hilaire, Belmont, CA (US); Mauro Meili, San Leandro, CA (US); Christophe Peroz, San Francisco, CA (US); Evgeni Poliakov, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 116 days.

(21) Appl. No.: 15/879,005

(22) Filed: Jan. 24, 2018

(65) Prior Publication Data

US 2018/0217395 A1 Aug. 2, 2018

Related U.S. Application Data

(60) Provisional application No. 62/451,587, filed on Jan. 27, 2017.

(51) Int. Cl.
*G02B 27/42* (2006.01)
*G02B 1/11* (2015.01)
(Continued)

(52) U.S. Cl.
CPC ......... *G02B 27/4205* (2013.01); *G02B 1/002* (2013.01); *G02B 1/111* (2013.01);
(Continued)

(58) Field of Classification Search
CPC .. G02B 5/1809; G02B 5/1547; G02B 5/1857; G02B 5/1876; G02B 5/0226;
(Continued)

(56) References Cited

U.S. PATENT DOCUMENTS 6,850,221 B1  2/2005  Tickle
7,905,650 B2  3/2011  Ma et al.
(Continued)

FOREIGN PATENT DOCUMENTS

CN  101177237 A   5/2008
CN  101556356     10/2009
(Continued)

OTHER PUBLICATIONS

International Search Report and Written Opinion for PCT Application No. PCT/US2018/015057, dated Apr. 5, 2018.
(Continued)

*Primary Examiner* — Marin Pichler
(74) *Attorney, Agent, or Firm* — Tobias Intellectual Property Law, PLLC

(57) ABSTRACT

Antireflection coatings for metasurfaces are described herein. In some embodiments, the metasurface may include a substrate, a plurality of nanostructures thereon, and an antireflection coating disposed over the nanostructures. The antireflection coating may be a transparent polymer, for example a photoresist layer, and may have a refractive index lower than the refractive index of the nanostructures and higher than the refractive index of the overlying medium (e.g., air). Advantageously, the antireflection coatings may reduce or eliminate ghost images in an augmented reality display in which the metasurface is incorporated.

10 Claims, 20 Drawing Sheets

(51) Int. Cl.
  *G02B 5/18*      (2006.01)
  *G02B 27/01*     (2006.01)
  *G02B 1/00*      (2006.01)
  *G02B 27/00*     (2006.01)
  *G02B 1/111*     (2015.01)

(52) U.S. Cl.
  CPC ....... *G02B 5/1847* (2013.01); *G02B 27/0093* (2013.01); *G02B 27/0172* (2013.01); *G02B 27/4272* (2013.01); *G02B 2027/014* (2013.01); *G02B 2027/0174* (2013.01); *G02B 2027/0178* (2013.01); *G02B 2027/0185* (2013.01); *G02B 2207/101* (2013.01)

(58) Field of Classification Search
  CPC .. G02B 5/0263; G02B 5/0268; G02B 5/0257; G02B 5/0278; G02B 5/021; G02B 1/002; G02B 1/11; G02B 1/111; G02B 1/113; G02B 1/115; G02B 1/116; G02B 1/118; G02B 27/42; G02B 27/4205; G02B 27/0093; G02B 27/0172; G02B 27/4272; G02B 27/4244; G02B 27/4261; G02B 27/4266; G02B 2027/014; G02B 2027/0174; G02B 2027/0178; G02B 2027/0185; G02B 2207/101
  USPC .......................................... 359/579–582, 586
  See application file for complete search history.

(56) References Cited

U.S. PATENT DOCUMENTS

| | | |
|---|---|---|
| 7,991,257 B1 | 8/2011 | Coleman et al. |
| 8,467,643 B2 | 6/2013 | Iizuka et al. |
| 8,917,447 B2 | 12/2014 | Wolk et al. |
| 8,950,867 B2 | 2/2015 | Macnamara |
| 9,081,426 B2 | 7/2015 | Armstrong |
| 9,176,065 B2 | 11/2015 | Bond et al. |
| 9,215,293 B2 | 12/2015 | Miller |
| 9,310,559 B2 | 4/2016 | Macnamara |
| 9,348,143 B2 | 5/2016 | Gao et al. |
| D758,367 S | 6/2016 | Natsume |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 9,887,459 B2 | 2/2018 | Casciato et al. |
| 10,254,454 B2 | 4/2019 | Klug et al. |
| 10,466,394 B2 | 11/2019 | Lin et al. |
| 10,527,851 B2 | 1/2020 | Lin et al. |
| 11,211,544 B2 | 12/2021 | Ubachs et al. |
| 11,243,338 B2 | 2/2022 | Lin et al. |
| 2004/0233534 A1 | 11/2004 | Nakanishi et al. |
| 2004/0263981 A1 | 12/2004 | Coleman |
| 2005/0161589 A1 | 7/2005 | Kim et al. |
| 2006/0028436 A1 | 2/2006 | Armstrong |
| 2006/0056166 A1 | 3/2006 | Yeo |
| 2006/0126179 A1 | 6/2006 | Levola |
| 2006/0126699 A1 | 6/2006 | Kaneda |
| 2006/0154044 A1 | 7/2006 | Yamada et al. |
| 2006/0240232 A1 | 10/2006 | Faris |
| 2007/0081123 A1 | 4/2007 | Lewis |
| 2007/0188837 A1 | 8/2007 | Shimizu et al. |
| 2007/0211337 A1 | 9/2007 | Himel et al. |
| 2007/0229955 A1 | 10/2007 | Kawamura et al. |
| 2008/0043302 A1 | 2/2008 | Park et al. |
| 2008/0176041 A1 | 7/2008 | Sato et al. |
| 2008/0225391 A1 | 9/2008 | Walter et al. |
| 2008/0278811 A1 | 11/2008 | Perkins et al. |
| 2009/0154871 A1 | 6/2009 | Pyo et al. |
| 2009/0184297 A1 | 7/2009 | Moriyama et al. |
| 2010/0039707 A1 | 2/2010 | Akahane et al. |
| 2010/0054662 A1 | 3/2010 | Hofrichter et al. |
| 2010/0157400 A1 | 6/2010 | Dimov et al. |
| 2010/0232017 A1 | 9/2010 | McCarthy et al. |
| 2011/0069727 A1 | 3/2011 | Reid et al. |
| 2011/0141541 A1 | 6/2011 | Bratkovski |
| 2011/0141873 A1* | 6/2011 | Miyasaka ............ G02B 5/1814 369/112.03 |
| 2011/0166045 A1 | 7/2011 | Dhawan et al. |
| 2011/0170184 A1 | 7/2011 | Wolk |
| 2011/0268145 A1 | 11/2011 | Kikuta et al. |
| 2011/0315988 A1* | 12/2011 | Yu .................. H01L 31/145 257/52 |
| 2012/0013989 A1 | 1/2012 | Choi et al. |
| 2012/0099817 A1 | 4/2012 | Quan et al. |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0105438 A1 | 5/2013 | Zhu et al. |
| 2013/0117377 A1 | 5/2013 | Miller |
| 2013/0125027 A1 | 5/2013 | Abovitz |
| 2013/0176554 A1 | 7/2013 | Loncar et al. |
| 2013/0208234 A1 | 8/2013 | Lewis |
| 2013/0208332 A1 | 8/2013 | Yu et al. |
| 2013/0242262 A1 | 9/2013 | Lewis |
| 2013/0264470 A1 | 10/2013 | Nishiwaki |
| 2014/0063585 A1 | 3/2014 | Hagopian et al. |
| 2014/0064655 A1 | 3/2014 | Nguyen et al. |
| 2014/0071539 A1 | 3/2014 | Gao |
| 2014/0140653 A1 | 5/2014 | Brown et al. |
| 2014/0146390 A1 | 5/2014 | Kaempfe et al. |
| 2014/0167022 A1 | 6/2014 | Huh et al. |
| 2014/0177023 A1 | 6/2014 | Gao et al. |
| 2014/0204438 A1 | 7/2014 | Yamada et al. |
| 2014/0218468 A1 | 8/2014 | Gao et al. |
| 2014/0233126 A1 | 8/2014 | Ye et al. |
| 2014/0264998 A1 | 9/2014 | Smith et al. |
| 2014/0267420 A1 | 9/2014 | Schowengerdt |
| 2014/0272295 A1 | 9/2014 | Deshpande et al. |
| 2014/0306866 A1 | 10/2014 | Miller et al. |
| 2014/0333926 A1* | 11/2014 | Bond .................. B82Y 20/00 356/301 |
| 2015/0016777 A1 | 1/2015 | Abovitz et al. |
| 2015/0040978 A1 | 2/2015 | Shalaev et al. |
| 2015/0103306 A1 | 4/2015 | Kaji et al. |
| 2015/0116721 A1 | 4/2015 | Kats et al. |
| 2015/0253570 A1 | 5/2015 | Sunnari et al. |
| 2015/0167921 A1 | 6/2015 | Gollier et al. |
| 2015/0178939 A1 | 6/2015 | Bradski et al. |
| 2015/0205034 A1 | 7/2015 | Facke et al. |
| 2015/0205126 A1 | 7/2015 | Schowengerdt |
| 2015/0219806 A1 | 8/2015 | Arbabi et al. |
| 2015/0219807 A1 | 8/2015 | Lochbihler |
| 2015/0219842 A1 | 8/2015 | Sqalli et al. |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0277117 A1 | 10/2015 | Yamada et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0025626 A1 | 1/2016 | Dos Santos Fegadolli et al. |
| 2016/0025914 A1 | 1/2016 | Brongersma et al. |
| 2016/0026253 A1 | 1/2016 | Bradski et al. |
| 2016/0004679 A1 | 3/2016 | Ajiki et al. |
| 2016/0061993 A1* | 3/2016 | Ren .................. G02B 5/30 349/62 |
| 2016/0077261 A1 | 3/2016 | Arbabi et al. |
| 2016/0110920 A1 | 4/2016 | Schowengerdt |
| 2016/0154044 A1 | 7/2016 | Yamada et al. |
| 2016/0306079 A1 | 10/2016 | Arbabi et al. |
| 2017/0010488 A1* | 1/2017 | Klug .................. G02B 6/0076 |
| 2017/0131460 A1 | 5/2017 | Lin et al. |
| 2017/0235144 A1 | 8/2017 | Piskunov et al. |

(56) References Cited

U.S. PATENT DOCUMENTS

| | | |
|---|---|---|
| 2017/0322418 A1 | 11/2017 | Lin et al. |
| 2018/0045953 A1 | 2/2018 | Fan et al. |
| 2018/0156949 A1 | 6/2018 | Tsai et al. |
| 2018/0341090 A1 | 11/2018 | Devlin et al. |
| 2019/0206136 A1 | 7/2019 | West et al. |
| 2020/0142110 A1 | 5/2020 | Lin |
| 2020/0150437 A1 | 5/2020 | Lin |
| 2020/0333609 A1 | 10/2020 | Leister et al. |

FOREIGN PATENT DOCUMENTS

| | | |
|---|---|---|
| CN | 102112898 A | 6/2011 |
| CN | 103620478 | 3/2014 |
| CN | 104659179 A | 5/2015 |
| CN | 105374918 A | 5/2018 |
| CN | 111399107 A | 7/2020 |
| CN | 104956148 A | 9/2021 |
| EP | 3 452 301 | 3/2019 |
| GB | 1588370 | 4/1981 |
| GB | 1588370 A | 4/1981 |
| JP | 60-140204 | 7/1985 |
| JP | 62-86307 | 4/1987 |
| JP | 62-086307 A | 4/1987 |
| JP | H06-347630 | 12/1994 |
| JP | H11-295524 A | 10/1999 |
| JP | 2001264527 A | 9/2001 |
| JP | 2003-502708 A | 1/2003 |
| JP | 2003-344630 A | 12/2003 |
| JP | 2005-018061 A | 1/2005 |
| JP | 2006-320807 A | 11/2006 |
| JP | 2006-337758 A | 12/2006 |
| JP | 2007-033558 | 2/2007 |
| JP | 2007-079608 | 3/2007 |
| JP | 2007-265581 A | 10/2007 |
| JP | 2008-511874 | 4/2008 |
| JP | 2008-523422 | 7/2008 |
| JP | 2008-535032 | 8/2008 |
| JP | 2009-506347 A | 2/2009 |
| JP | 2009-169213 A | 7/2009 |
| JP | 2009-169214 A | 7/2009 |
| JP | 2009-192979 A | 8/2009 |
| JP | 2009-288718 | 12/2009 |
| JP | 2010-139621 | 6/2010 |
| JP | WO 2011/001641 | 1/2011 |
| JP | 2012-027221 A | 2/2012 |
| JP | 2012-27221 A | 2/2012 |
| JP | 2012-510637 A | 5/2012 |
| JP | 2012-230246 A | 11/2012 |
| JP | 2012-256055 A | 12/2012 |
| JP | WO 2012-046414 | 2/2014 |
| JP | 2014-142386 A | 8/2014 |
| JP | 2014-142386 A | 8/2014 |
| JP | 2015-049376 | 3/2015 |
| JP | 2015-105990 | 6/2015 |
| JP | 2015-105990 A | 6/2015 |
| JP | 2015-524935 | 8/2015 |
| JP | 2015-166861 | 9/2015 |
| JP | 2015-194551 | 11/2015 |
| JP | 2015-194551 A | 11/2015 |
| JP | 2015-534117 | 11/2015 |
| JP | 2016-527571 A | 9/2016 |
| JP | 2017-500605 A | 1/2017 |
| JP | 2018-536204 A | 12/2018 |
| JP | 2020-507112 | 3/2020 |
| JP | 2021-509727 A | 4/2021 |
| KR | 2015-0043391 | 4/2015 |
| KR | 10-1556356 | 9/2015 |
| TW | 2015-30195 A | 8/2015 |
| TW | 201530195 A | 8/2015 |
| TW | 201546580 A | 12/2015 |
| WO | WO 2000/79317 | 12/2000 |
| WO | WO 2006/041596 | 4/2006 |
| WO | WO 2006/063049 | 6/2006 |
| WO | WO 2006/0106501 | 10/2006 |
| WO | WO 2007/089073 | 8/2007 |
| WO | WO 2008/056577 | 5/2008 |
| WO | WO 2010/039301 | 4/2010 |
| WO | WO 2012/04644 | 4/2012 |
| WO | WO 2013/162609 | 10/2013 |
| WO | WO 2014/044912 | 3/2014 |
| WO | WO 2015/023536 | 2/2015 |
| WO | WO 2015/081313 | 6/2015 |
| WO | WO 2016/161175 | 10/2016 |
| WO | WO 2016/168173 | 10/2016 |
| WO | WO 2016/205249 | 12/2016 |
| WO | WO 2016/205256 | 12/2016 |
| WO | WO 2017/079480 | 5/2017 |
| WO | WO 2017/193012 | 11/2017 |
| WO | WO 2018/140651 | 8/2018 |
| WO | WO 2018/140502 | 3/2019 |

OTHER PUBLICATIONS

International Preliminary Report on Patentability for PCT Application No. PCT/US2018/015057, dated Aug. 8, 2019.
Aieta, F. et al., "Multiwavelength achromatic mefasurfaces by dispersive phase compensation," Science, vol. 347, Issue 6228, Mar. 20, 2015, in 5 pages. URL: www.sciencemag.org.
Arbabi, A. et al., "Dielectric metasurfaces for complete control of phase and polarization with subwavelength spatial resolution and high transmission," Nature Nanotechnology, published online Aug. 31, 2015, in 8 pages. URL: www.nature.com/naturenanotechnology.
Cunningham et al., "A plastic colorimetric resonant optical biosensor for multiparallel detection of label-free biochemical interactions," Sensors and Actuators B, vol. 85, Jul. 2002, in 8 pages.
Hasman, E. et al., "Polarization dependent focusing lens by use of quantized Pancharatnam-Berry phase diffractive optics", Applied Physics Letters, vol. 82, No. 3, Jan. 20, 2003, in 3 pages.
Khorasaninejad, M. et al., "Broadband Multifunctional Efficient Meta-Gratings Based on Dielectric Waveguide Phase Shifters", Nano Letters, vol. 15, Sep. 2015, in 7 pages.
Kildishev, A. et al., "Planar Photonics with Metasurfaces", Science, vol. 339, Mar. 15, 2013, in 9 pages. URL: http://d .doi.org/10.1126/science.1232009.
Lin, D. et al., "Dielectric gradient metasurface optical elements", Science, vol. 345, Issue 6194, Jul. 18, 2014, in 6 pages.
Lin, D. et al., "Supplementary Materials for Dielectric gradient metasurface optical elements", Science, vol. 345, Issue 6194, Jul. 18, 2014, in 22 pages.
Pors, A. et al., "Gap plasmon-based metasurfaces for total control of reflected light", Scientific Reports, vol. 3, Jul. 8, 2013, in 6 pages.
Shalaev et al., "High-Efficiency All Dielectric Metasurfaces for Ultra-Compact Beam Manipulation in Transmission Mode," Nano letters 15.9 (2015): 6261-6266.
Yu, N. et al., "Light Propagation with Phase Discontinuities: Generalized Laws of Reflection and Refraction," Science, vol. 334, No. 333, Oct. 21, 2011, in 6 pages. URL: www.sciencemag.org.
Yu, N. et al., "Optical Metasurfaces and Prospect of Their Applications Including Fiber Optics", Journal of Lightwave Technology, vol. 33, No. 12, Jun. 15, 2015, in 15 pages. URL: http://ieeeplore.ieee.org/document/7045485/.
Zhu, A. Y. et al., "Broadband visible wavelength high efficiency meta-gratings", Conference on Lasers and Electro-Optics, OSA Technical Digest (online), Jan. 2016, in 2 pages.
Hongqiang, et al., "Large-Area Binary Blazed Grating Coupler between Nanophotonic Waveguide and LED," The Scientific World Journal, vol. 2014, Article ID 586517, in six pages.
Laakkonen, et al., "Double-groove, two-depth grating coupler for light guides," J. Opt. Soc. Am. A/vol. 23, No. 12/Dec. 2006.
Zhou, et al., "Silicon photonic devices based on binary blazed gratings," Optical Engineering 52(9), Sep. 2013.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

(56) References Cited

OTHER PUBLICATIONS

Azuma, "Predictive Tracking for Augmented Realty," TR95-007, Department of Computer Science, UNC—Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Schowengerdt, et al., "Volumetric Display Using Scanned Fiber Array," in Journal of SID Symposium Digest of Technical papers, vol. 41, Issue 1, May 2010.
Zhao, et al., Manipulating light polarization with ultrathin plasmonic metasurfaces, Physical Review B, vol. 84, 84, 205428 (2011), Nov. 2011.
Office Action dated Aug. 30, 2022 issued in IL app. No. 268115.
Office Action (translated) dated Oct. 9, 2022 issued in CN app. No. 201880020962.X.
Office Action (translated) dated Oct. 19, 2022 issued in KR app. No. 10-2019-7024534.
EP18744218.1 Examination Report dated Dec. 16, 2022.

\* cited by examiner

ANTIREFLECTION COATINGS FOR METASURFACES

PRIORITY CLAIM

This application claims the benefit of priority under 35 U.S.C. § 119(e) of U.S. Provisional Application No. 62/451,587 filed on Jan. 27, 2017. The entire disclosure of each of these priority documents is incorporated herein by reference.

INCORPORATION BY REFERENCE

This application incorporates by reference the entirety of each of the following patent applications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; U.S. application Ser. No. 14/331,218 filed on Jul. 14, 2014; U.S. patent application Ser. No. 15/342,033, filed Nov. 2, 2016; U.S. Provisional Application No. 62/333,067, filed May 6, 2016; U.S. Provisional Application No. 62/451,608, entitled "DIFFRACTION GRATINGS FORMED BY METASURFACES HAVING DIFFERENTLY ORIENTED NANOBEAMS," filed on Jan. 27, 2017; and U.S. Provisional Application No. 62/451,615, entitled "DIFFRACTION GRATINGS BASED ON METASURFACES HAVING ASYMMETRIC OPTICAL ELEMENTS," filed on Jan. 27, 2017.

BACKGROUND

Field

The present disclosure relates to optical systems such as display systems, including augmented reality systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

According to some embodiments, optical systems are presented herein. In some embodiments an optical system may comprise an optically transmissive substrate, a metasurface overlying the substrate, the metasurface comprising a plurality of nanostructures, and an antireflection coating comprising an optically transparent material conformally disposed over the nanostructures of the metasurface, wherein the optically transparent material has a refractive index less than a refractive index of the nanostructures.

According to some embodiments, the antireflection coating is an interference coating. In some embodiments, the metasurface comprises a diffraction grating. In some embodiments, the metasurface comprises an asymmetric diffraction grating. In some embodiments, the metasurface comprises a Pancharatnam-Berry phase optical element (PBOE). In some embodiments, the metasurface comprises multi-tier nanostructures. In some embodiments, the optically transparent material comprises a polymer. In some embodiments, the optically transparent material comprises photoresist. In some embodiments, the optically transparent material has a refractive index from about 1.2 to about 2. In some embodiments, a distance from a topmost surface of the nanostructures to a topmost surface of the antireflection coating is from about 10 nm to about 1 micron. In some embodiments, a distance from a topmost surface of the nanostructures to a topmost surface of the antireflection coating is from about 30 nm to about 250 nm. In some embodiments, the antireflection coating forms a planarization layer extending between and over the nanostructures.

According to some other embodiments, optical systems are presented herein, comprising an antireflection coating for an optical element comprising a metasurface, the antireflection coating comprising a layer of an optically transparent material having a refractive index greater than 1 and less than a refractive index of a material comprising the metasurface, wherein the layer of polymer material layer is conformally disposed over the metasurface.

According to some embodiments, the optically transparent material comprises a polymer. In some embodiments, the optically transparent material comprises photoresist. In some embodiments, the optically transparent material has a refractive index from about 1.2 to about 2. In some embodiments, a distance from a topmost surface of the metasurface to a topmost surface of the antireflection coating is from about 10 nm to about 1 micron. In some embodiments, the antireflection coating reduces an amount of incident light reflected by the metasurface by more than about 50% as compared to an amount of incident light reflected by a substantially similar metasurface that does not include the antireflection coating. In some embodiments, the incident light has an incident angle from about −50° to 50°.

According yet other embodiments, methods for forming an antireflection coating on a metasurface are provided. In some embodiments, a method may comprise providing an optically transmissive substrate comprising a metasurface, the metasurface comprising a plurality of nanostructures, depositing a layer of an optically transparent material over the plurality of nanostructures, wherein the layer of optically transparent material forms the antireflection coating.

According to some embodiments, the optically transparent material comprises a polymer. In some embodiments, the optically transparent material comprises photoresist. In some embodiments, a distance from a topmost surface of the nanostructures to a topmost surface of the formed antireflection coating is from about 10 nm to about 1 micron. In some embodiments, conformally depositing the optically transparent material comprises spin coating the optically transparent material over the nanostructures. In some embodiments, conformally depositing the optically transparent material comprises performing a chemical vapor deposition (CVD) process.

Various additional embodiments are provided below.

1. An optical system comprising:
   an optically transmissive substrate;
   a metasurface overlying the substrate, the metasurface comprising a plurality of nanostructures; and
   an antireflection coating comprising an optically transparent material conformally disposed over the nanostructures of the metasurface, wherein the optically transparent material has a refractive index less than a refractive index of the nano structures.

2. The optical system of Embodiment 1, wherein the antireflection coating is an interference coating.

3. The optical system of Embodiment 1, wherein the metasurface comprises a diffraction grating.

4. The optical system of Embodiment 3, wherein the metasurface comprises an asymmetric diffraction grating.

5. The optical system of any one of Embodiments 1-3, wherein the metasurface comprises a Pancharatnam-Berry phase optical element (PBOE).

6. The optical system of Embodiment 1, wherein the metasurface comprises multi-tier nanostructures.

7. The optical system of any one of Embodiments 1-6, wherein the optically transparent material comprises a polymer.

8. The optical system of Embodiment 7, wherein the optically transparent material comprises photoresist.

9. The optical system of any one of Embodiments 1-8, wherein the optically transparent material has a refractive index from about 1.2 to about 2.

10. The optical system of any one of Embodiments 1-9, wherein a distance from a topmost surface of the nanostructures to a topmost surface of the antireflection coating is from about 10 nm to about 1 micron.

11. The optical system of Embodiment 10, wherein a distance from a topmost surface of the nanostructures to a topmost surface of the antireflection coating is from about 30 nm to about 250 nm.

12. The optical system of any one of Embodiments 1-11, wherein the antireflection coating forms a planarization layer extending between and over the nano structures.

13. An optical system comprising:
   antireflection coating for an optical element comprising a metasurface, the antireflection coating comprising:
      a layer of an optically transparent material having a refractive index greater than 1 and less than a refractive index of a material comprising the metasurface, wherein the layer of polymer material layer is conformally disposed over the metasurface.

14. The antireflection coating of Embodiment 13, wherein the optically transparent material comprises a polymer.

15. The antireflection coating of Embodiment 14, wherein the optically transparent material comprises photoresist.

16. The antireflection coating of any one of Embodiments 13-15, wherein the optically transparent material has a refractive index from about 1.2 to about 2.

17. The antireflection coating of any one of Embodiments 13-16, wherein a distance from a topmost surface of the metasurface to a topmost surface of the antireflection coating is from about 10 nm to about 1 micron.

18. The antireflection coating of any one of Embodiments 13-17, wherein the antireflection coating reduces an amount of incident light reflected by the metasurface by more than about 50% as compared to an amount of incident light reflected by a substantially similar metasurface that does not include the antireflection coating.

19. The antireflection coating of Embodiment 18, wherein the incident light has an incident angle from about −20° to 20°.

20. A method for forming an antireflection coating on a metasurface, the method comprising:
   providing an optically transmissive substrate comprising a metasurface, the metasurface comprising a plurality of nanostructures;
   depositing a layer of an optically transparent material over the plurality of nanostructures, wherein the layer of optically transparent material forms the antireflection coating.

21. The method of Embodiment 20, wherein the optically transparent material comprises a polymer.

22. The method of Embodiment 21, wherein the optically transparent material comprises photoresist.

23. The method of any one of Embodiments 20-22, wherein a distance from a topmost surface of the nanostructures to a topmost surface of the formed antireflection coating is from about 10 nm to about 1 micron.

24. The method of any one of Embodiments 20-23, wherein conformally depositing the optically transparent material comprises spin coating the optically transparent material over the nano structures.

25. The method of any one of Embodiments 20-23, wherein conformally depositing the optically transparent material comprises performing a chemical vapor deposition (CVD) process.

DETAILED DESCRIPTION

Figure 1:
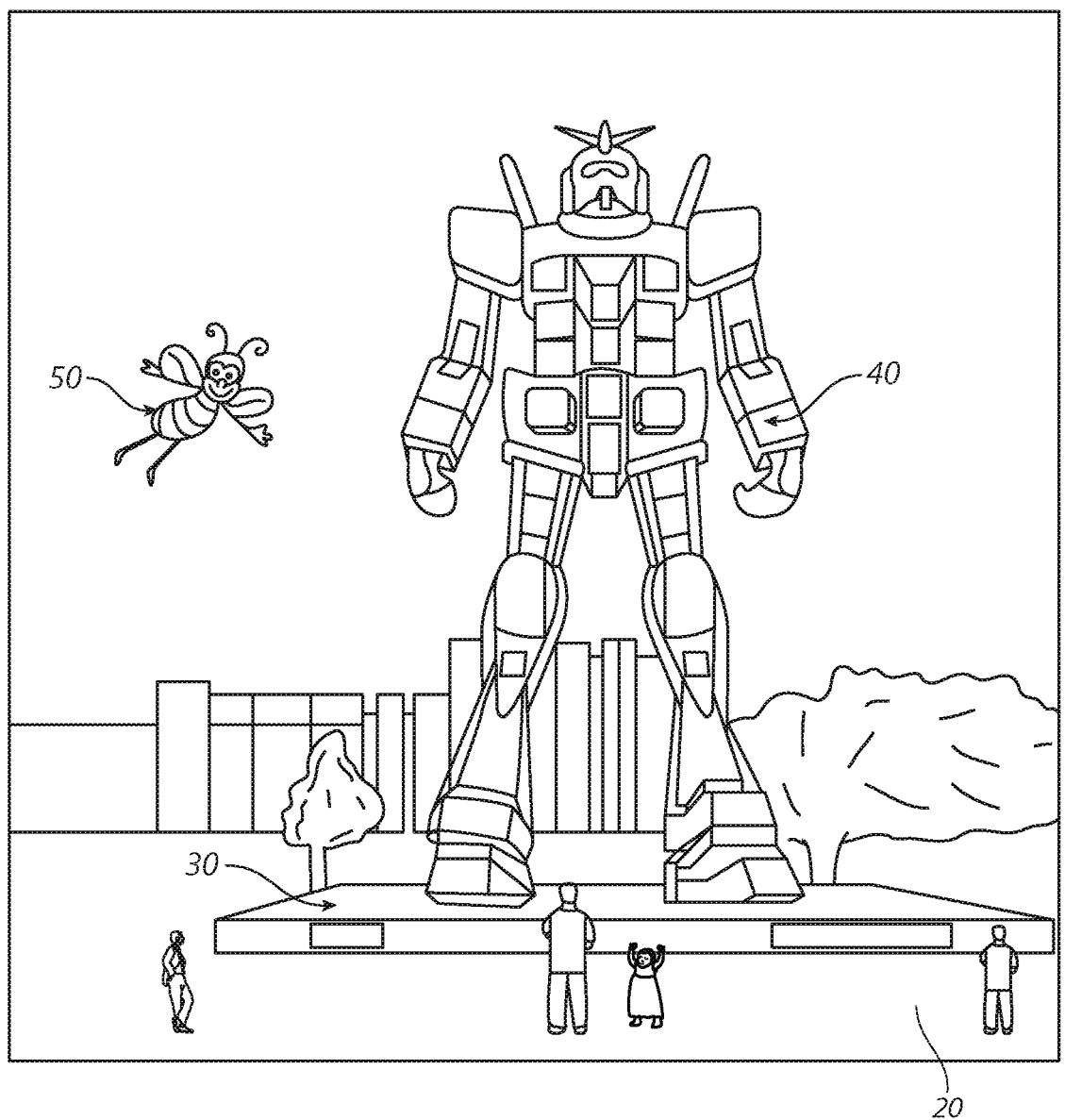
FIG. 1 illustrates a user's view of augmented reality (AR) through an AR device.

Metasurfaces, also referred to as metamaterial surfaces, provide opportunities to realize virtually flat, aberration-free optics on much smaller scales, in comparison with geometrical optics. Without being limited by theory, in some embodiments, metasurfaces include dense arrangements of surface structures, or nanostructures, that function as resonant optical antennas. The resonant nature of the light-surface structure interaction provides the ability to manipulate optical wave-fronts. In some cases, the metasurfaces may allow the replacement of bulky or difficult to manufacture optical components with thin, planar elements formed by simple patterning processes.

It will be appreciated that optical elements formed of metasurfaces may function in the reflective and/or transmissive mode. In the reflective mode, the metasurface may reflect light at desired angles. In the transmissive mode, the metasurface may transmit light through the body of the metasurface while also deflecting that light at desired angles. Undesirably, metasurfaces working in the transmissive mode may also reflect incident light, e.g., due to Fresnel reflections at interfaces with other materials. In addition, for metasurfaces working in the reflective mode, the angles at which the metasurfaces are configured to reflect light may be different from the angles at which light is reflected off of interfaces.

Undesirably, unintended reflections by metasurfaces may cause optical artifacts. For example, in display devices in which metasurfaces are used as optical elements for directing light encoded with image content (e.g., light modified by a spatial light modulator), the reflections may cause ghost images due to the reflection of some of the light back and forth along an optical path before reaching the user. For example, metasurfaces may form incoupling optical elements for incoupling light into a waveguide, which in turn is configured to output image content to a user. Where part of this light is reflected rather than incoupled into the waveguide, the reflected light may propagate back to a light projector or light source, which may then reflect the light back to the metasurface for incoupling into the waveguide, and ultimately output to a user. Due to this back-and-forth reflection, light from prior video image frames may be provided to the waveguide along with light encoding current image frames. The light encoding prior image frames may be visible to the user as a ghost image that decreases the image quality of the display device.

In some embodiments, an antireflection coating may reduce or eliminate the reflection of light from metasurfaces. The antireflection coating may be formed of an optically transmissive layer of material, such as a polymer layer, e.g., a layer of photoresist. In some embodiments, no air or other material may be present between the metasurface and the antireflection coating; the antireflection coating may directly contact the metasurface. The material forming the antireflection coating may have a refractive index lower than the refractive index of the nanostructures of the metasurface, but higher than the refractive index of the material or medium (e.g., air) forming an interface with the antireflective coating opposite the metasurface.

In some embodiments, the antireflection coating may be an interference coating and the thickness of the layer of material is selected to provide destructive interference between light reflecting off the top and bottom surfaces of the layer. Preferably, the thickness of the layer is selected to provide this interference for light of visible wavelengths. In some embodiments, the metasurfaces may be part of a color display utilizing a plurality of component colors. As a result, a particular metasurface may only be exposed to light of an associated limited range of wavelengths corresponding to a particular component color, and the antireflection coating may have a thickness selected to provide interference for light having this associated limited range of wavelengths.

In some embodiments, the antireflection coating may be a planar layer extending over and between the nanostructures forming the metasurfaces, and forming a planar surface of the nanostructures. Such a planar layer may advantageously provide antireflection properties over a wide range of angles of incident light. In some embodiments, the antireflection coating may be a conformal layer disposed on the surfaces of the nanostructures forming the metasurfaces. The conformal layer may be continuous and extend over and in between multiple nanostructures, or may be isolated on individual ones of the nanostructures.

Advantageously, the reduction in reflections may reduce or eliminate optical effects such as ghost images, thereby allowing a display device to output images with higher perceived quality. In some embodiments, an antireflection coating may reduce the amount of light reflected by a metasurface, relative to identical structure without the antireflection coating, by about 50%, 75%, 85%, 90%, 95%, 99%, or more. The antireflection coating may be particularly advantageously applied to metasurfaces operating in the transmissive mode, for which reflections are not part of the design of the metasurface.

Reference will now be made to the drawings, in which like reference numerals refer to like parts throughout.

In some embodiments, the metasurfaces may advantageously be applied to form optical elements in display devices, such as display devices for AR or VR display systems. These display systems may display virtual content to a user, or viewer, and AR systems may also allow the user to see the world around them by transmitting light from the surrounding environment to the user's eyes. Preferably, this virtual content is displayed on a wearable head-mounted display, e.g., as part of eyewear, that projects image information to the user's eyes. As used herein, it will be appreciated that a "head-mounted" display is a display that may be mounted on the head of a viewer.

Figure 2:
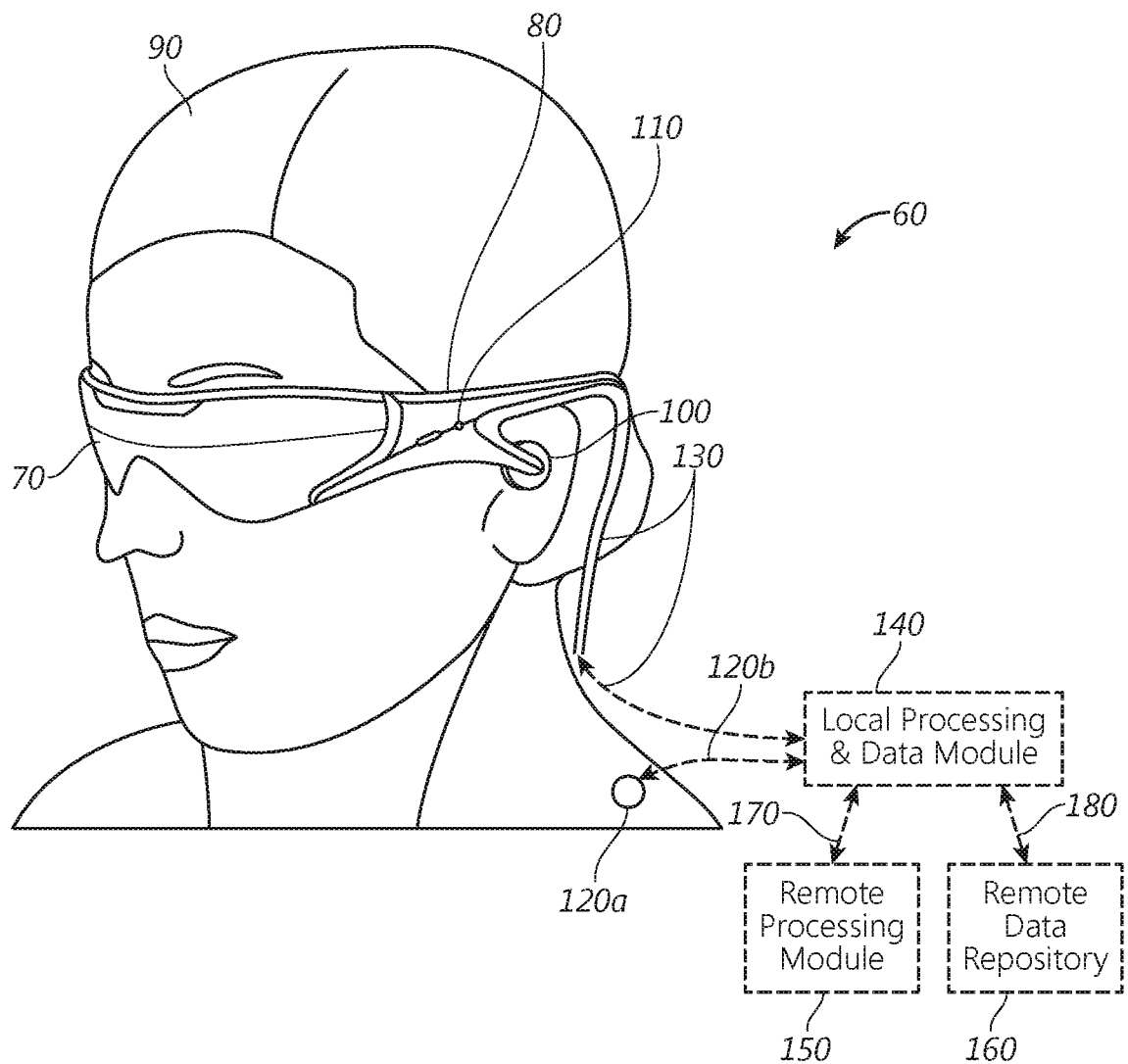
FIG. 2 illustrates an example of wearable display system.

FIG. 2 illustrates an example of wearable display system 80. The display system 80 includes a head-mounted display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. The display 62 may be considered eyewear in some embodiments. In some embodiments, a speaker 66 is coupled to the frame 64 and positioned adjacent the ear canal of the user 60 (in some embodiments, another speaker, not shown, is positioned adjacent the other ear canal of the user to provide for stereo/shapeable sound control). In some embodiments, the display system may also include one or more microphones 67 or other devices to detect sound. In some embodiments, the microphone is configured to allow the user to provide inputs or commands to the system 80 (e.g., the selection of voice menu commands, natural language questions, etc.), and/or may allow audio communication with other persons (e.g., with other users of similar display systems. The microphone may further be configured as a peripheral sensor to continuously collect audio data (e.g., to passively collect from the user and/or environment). Such audio data may include user sounds such as heavy breathing, or environmental sounds, such as a loud bang indicative of a nearby event. The display system may also include a peripheral sensor 30a, which may be separate from the frame 64 and attached to the body of the user 60 (e.g., on the head, torso, an extremity, etc. of the user 60). The peripheral sensor 30a may be configured to acquire data characterizing the physiological state of the user 60 in some embodiments, as described further herein. For example, the sensor 30a may be an electrode.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
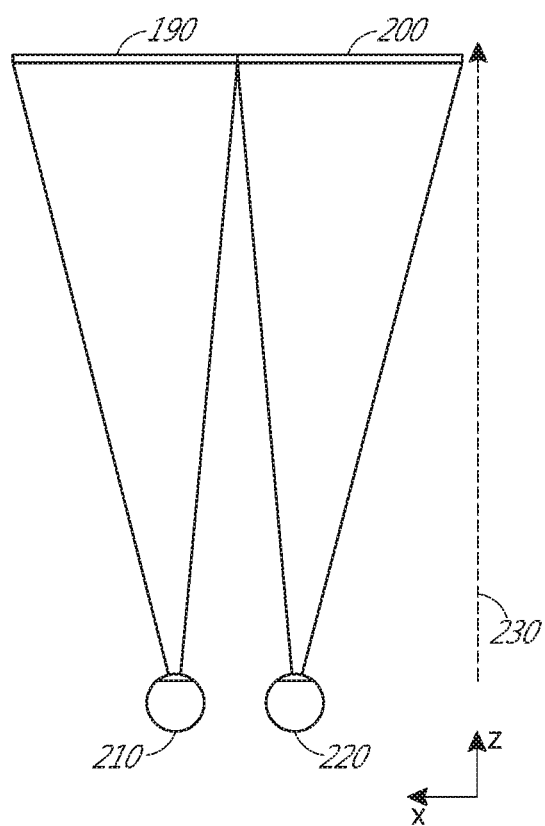
FIG. 3 illustrates a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
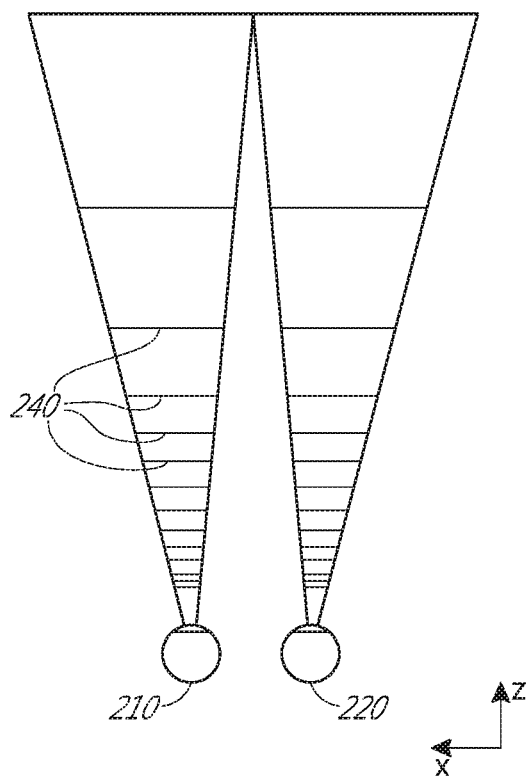
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, e.g., such that all features in a depth plane are in focus with the eye in a particular accommodated state.

Figure 5A:
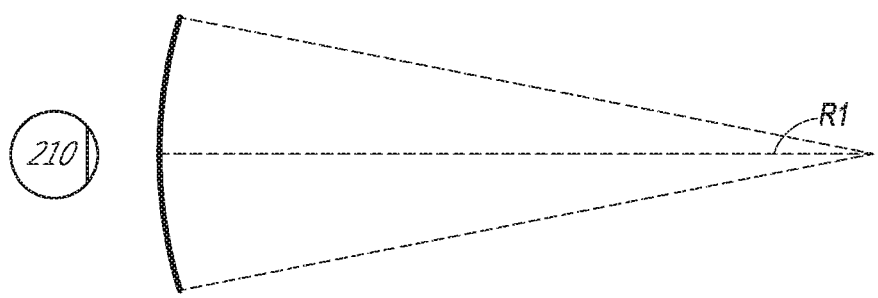
FIGS. 5A-5C illustrate relationships between radius of curvature and focal radius.
Figure 5B:
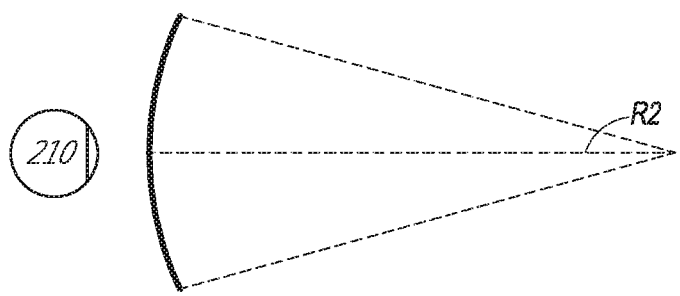
Figure 5C:
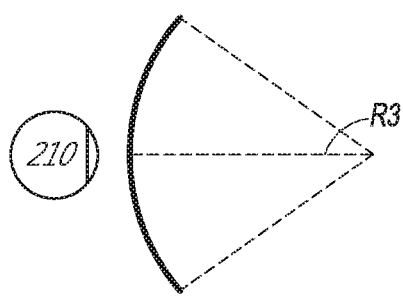

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
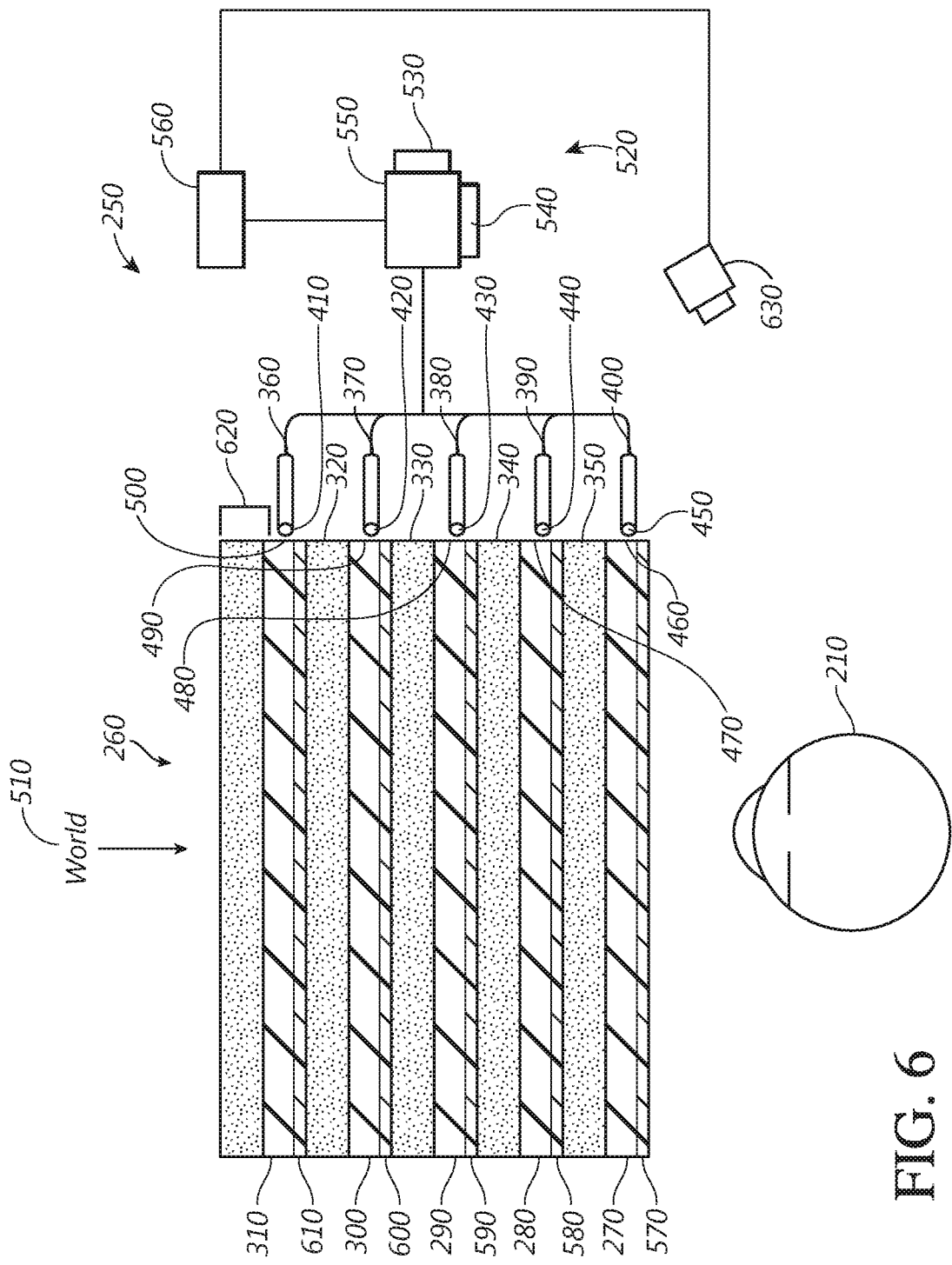
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated that a depth plane may follow the contours of a flat or a curved surface. In some embodiments, advantageously for simplicity, the depth planes may follow the contours of flat surfaces.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). It will be appreciated that the major surfaces of a waveguide correspond to the relatively large area surfaces of the waveguide between which the thickness of the waveguide extends. In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630. In some embodiments, one camera assembly 630 may be utilized for each eye, to separately monitor each eye.

Figure 7:
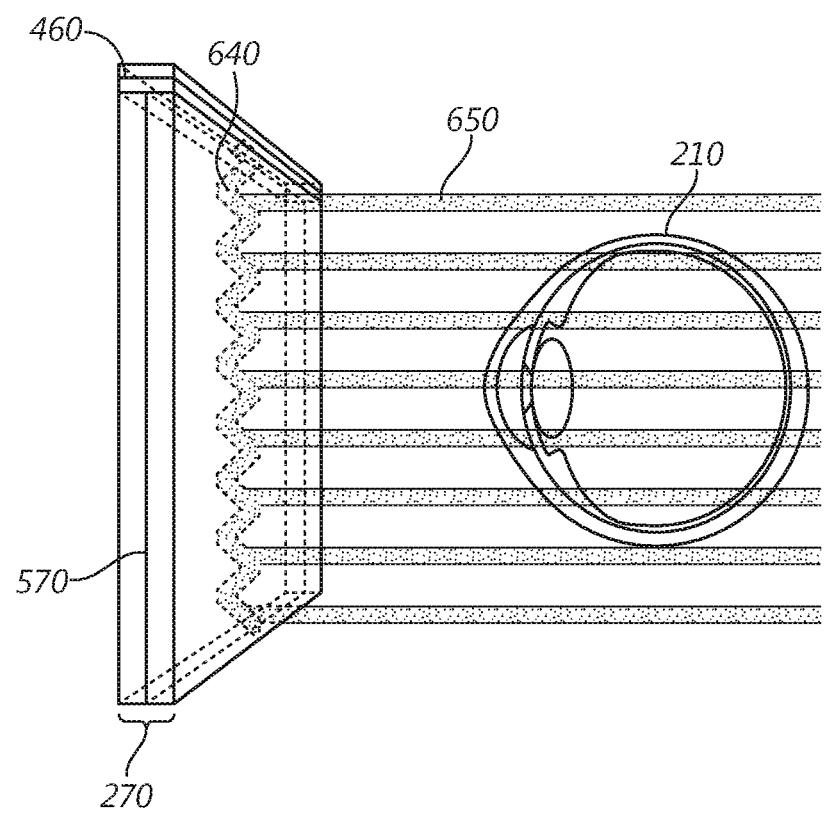
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
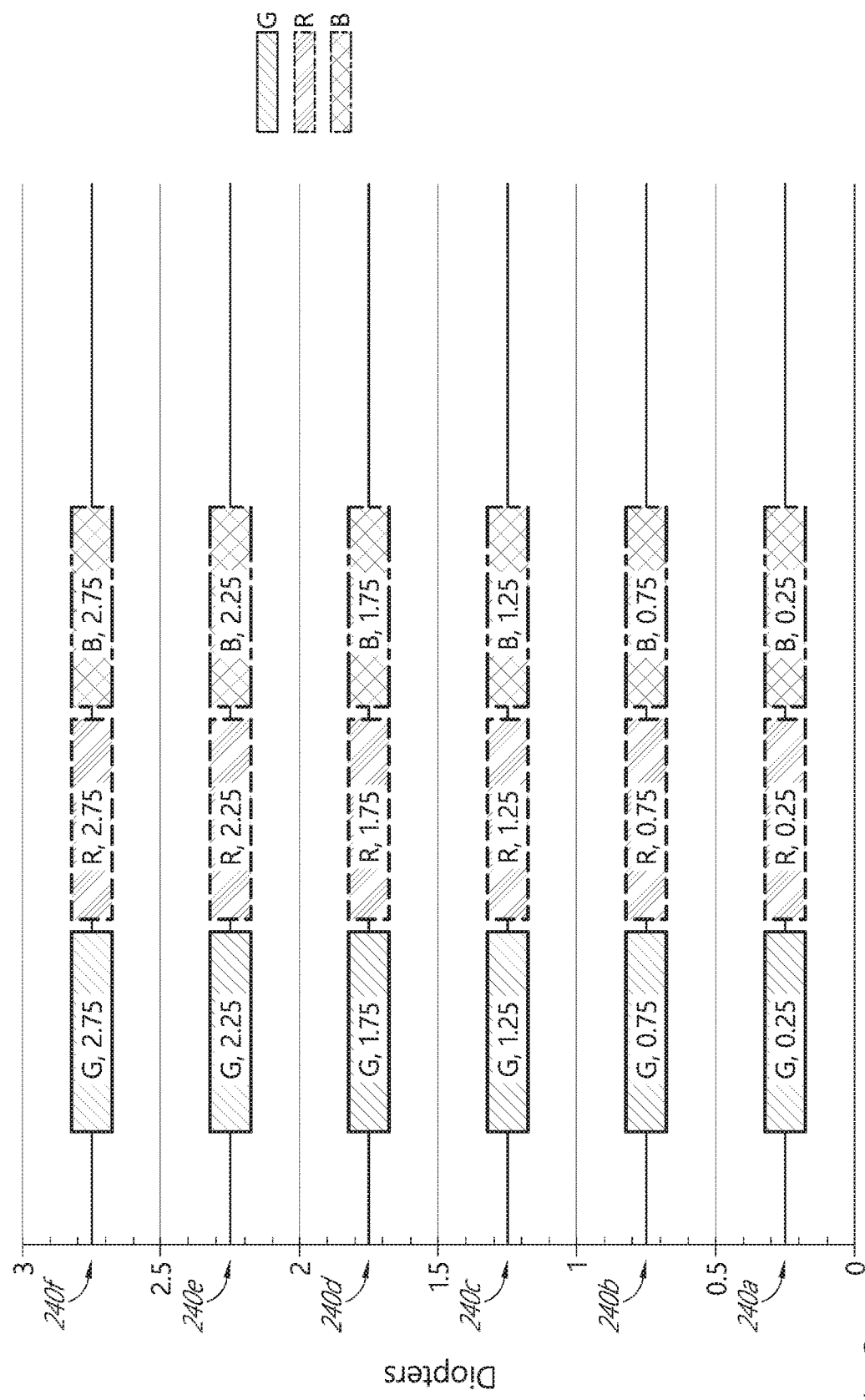
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
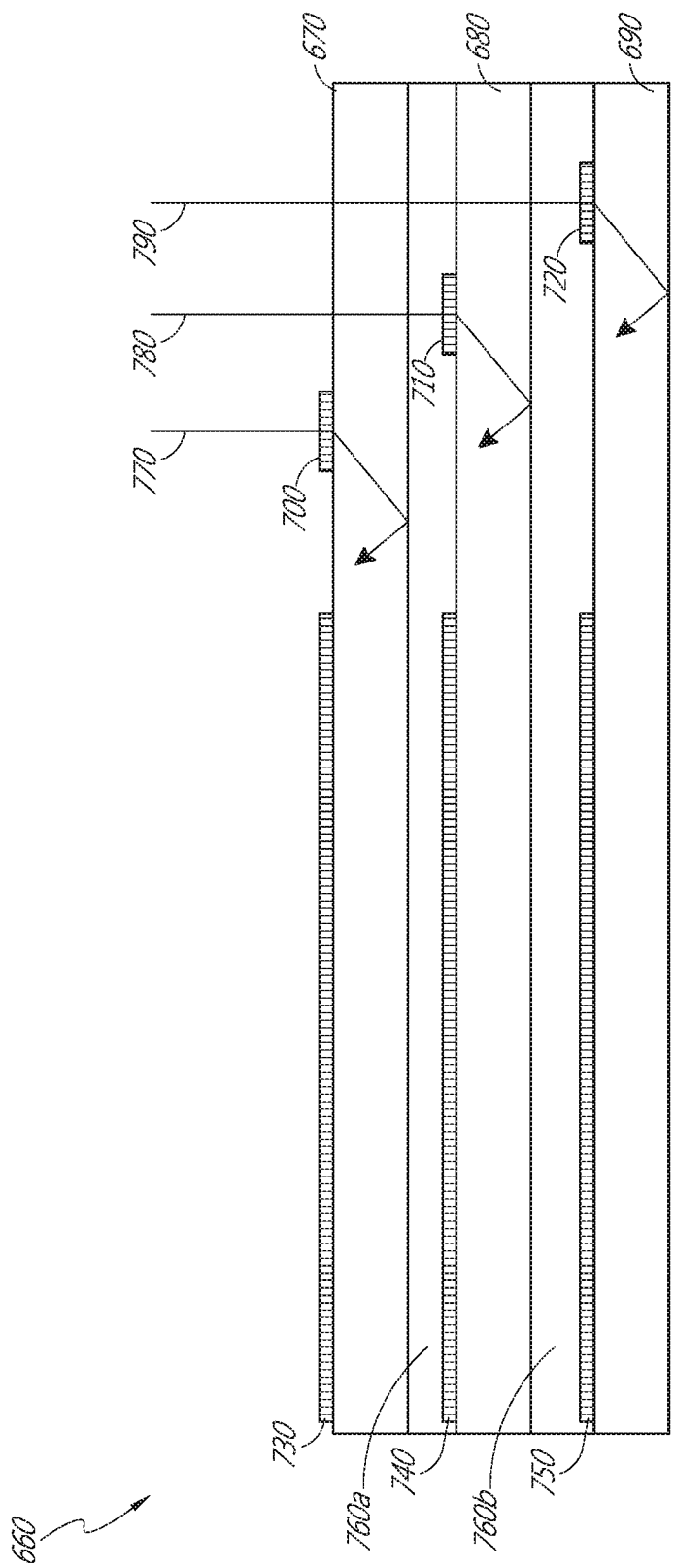
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 1242 and 1244, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
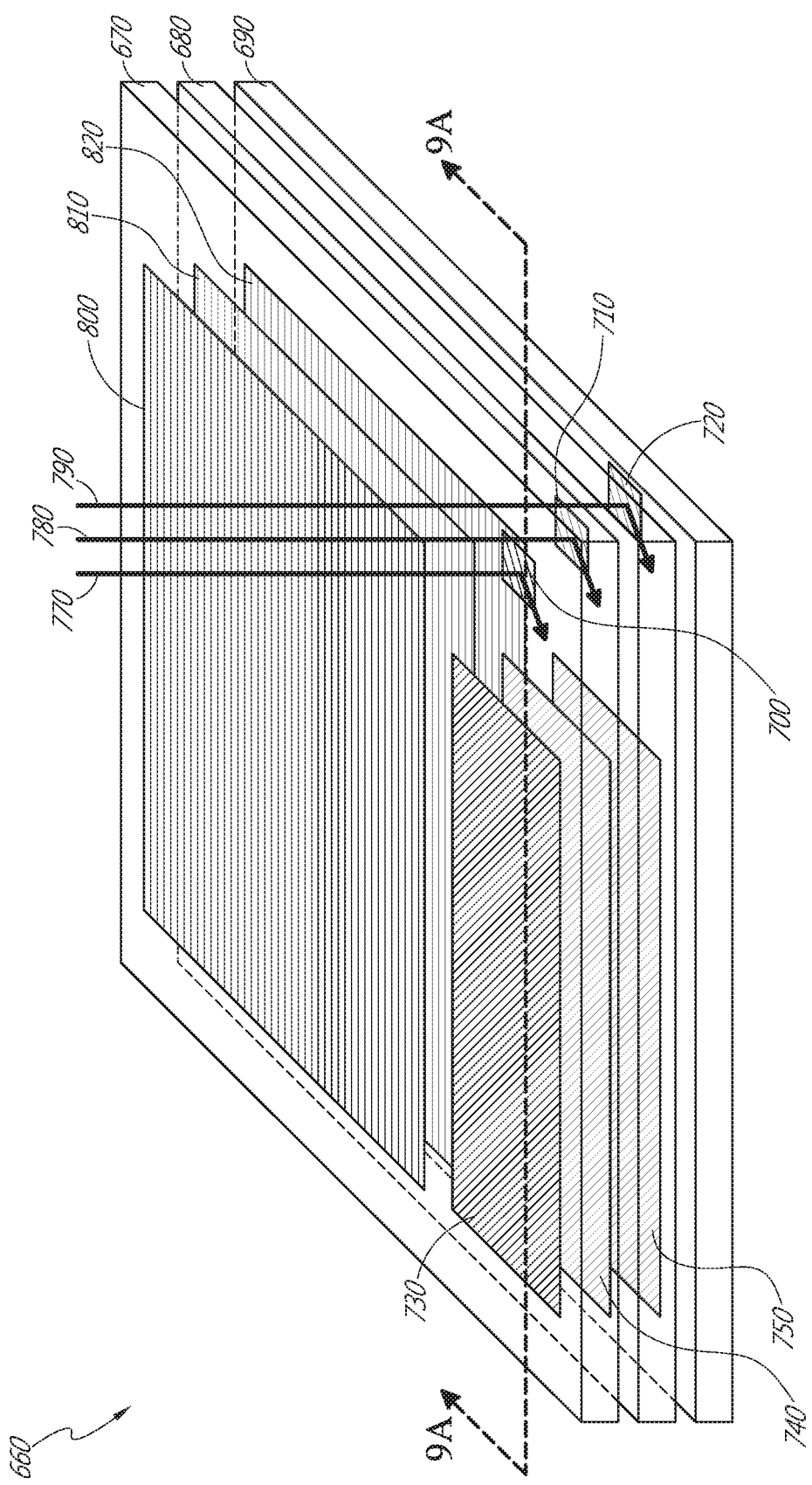
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
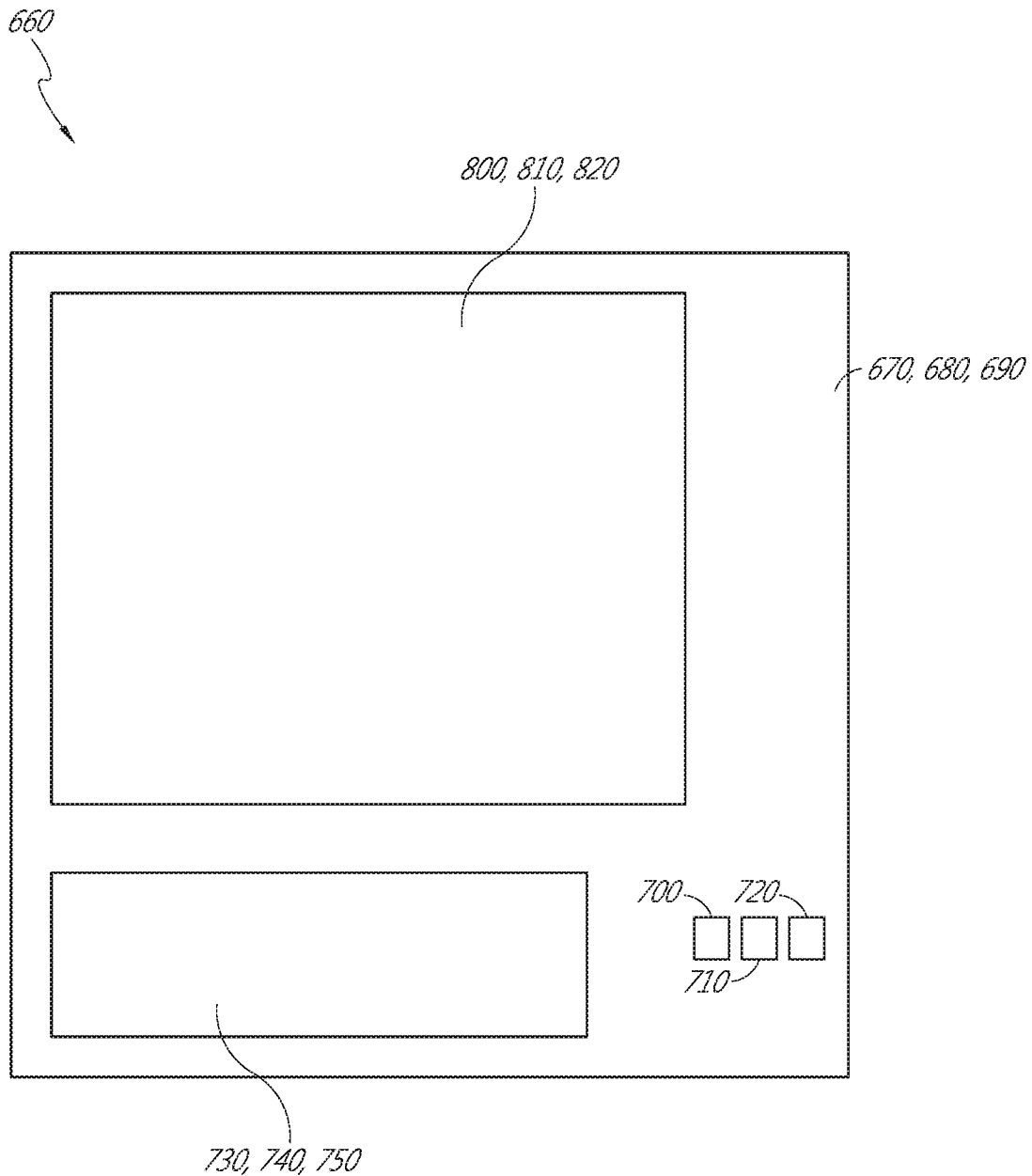
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 10:
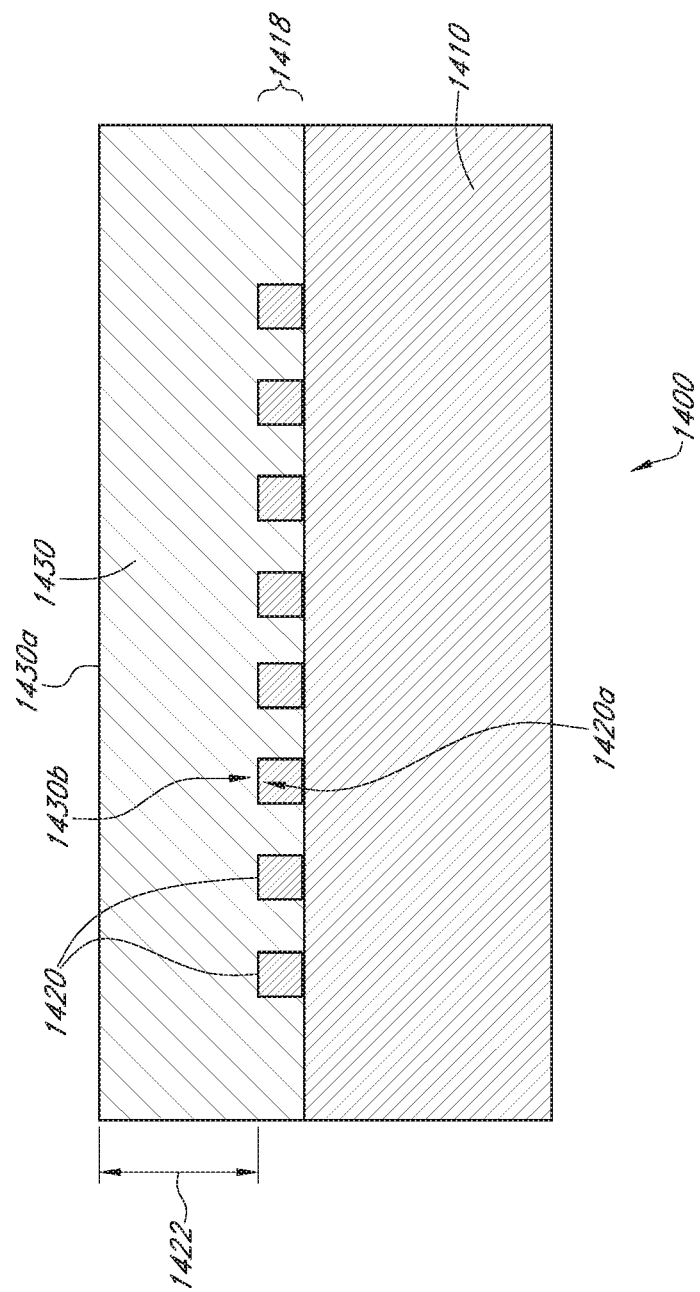
FIG. 10 illustrates a cross-sectional side view of an example optical structure including a metasurface and an antireflection coating.

With reference now to FIG. 10, and according to some embodiments, a cross-sectional side view is illustrated of an example optical structure 1400 comprising a metasurface 1418 formed by a plurality of nanostructures 1420 and an antireflection coating 1430 disposed directly over the nanostructures 1420. The metasurface 1418 and antireflection coating 1430 may be disposed on an optically transmissive substrate 1410. In some embodiments, as illustrated, the antireflection coating 1430 fills the spaces between the nanostructures 1420 such that no air or other material is disposed between the nanostructures 1420 and the antireflection coating 1430, at least over the majority of the expanse of the metasurface 1418. The antireflection coating 1430 may be optically transmissive or substantially transmissive to light.

In some embodiments, the antireflection coating 1430 has a substantially flat top surface 1430a. The antireflection coating 1430 may function as a planarization layer for the underlying uneven topology of the nanostructures 1420. In some embodiments, the top surface 1430a of the antireflection coating 1430 may be substantially parallel to a generally horizontal plane defined by the top surfaces 1420a of the nanostructures 1420.

The thickness 1422 of the antireflection coating 1430 may be defined as the distance from the topmost surface 1420a of the nanostructures 1420 to the top surface of the antireflection coating 1430. In some embodiments, the thickness 1422 may be in a range from about 10 nm to about 2 microns. In some embodiments, the thickness 1422 may be from about 20 nm to about 1 micron. In some embodiments, the thickness 1422 may be from about 25 nm to about 500 nm, from about 30 nm to about 250 nm, from about 40 nm to about 100 nm, and from about 45 nm to about 55 nm. In some embodiments, the thickness 1422 may be about 50 nm. In some embodiments, the thickness 1422 may be greater than the height of the nanostructures 1420, where the height of the nanostructures 1420 is the distance from the bottom of the nanostructures 1420 to the topmost surface 1420a.

Without being bound by theory, the antireflection coating 1430 may provide impedance matching between an overlying medium (e.g., air) and one or both of the nanostructures 1420 and the substrate 1410, to reduced occurrence of reflections. It is also believed that the antireflection coating 1430 may cause destructive interference between light reflected from the top surface of the antireflection coating 1430a and bottom surface of the antireflection coating 1430b and/or light backscattered from the surfaces of the nanostructures 1420 and/or the surface of the substrate 1410. This interference is believed to lead to a reduction or elimination in the amount of light perceived to be reflected from the optical structure 1400. In some embodiments, the ability of the antireflection coating 1430 to reduce or eliminate reflected light from the optical structure 1400 may depend on the thickness of the antireflection coating 1430 and the wavelength of light impinging on the antireflection coating 1430. Preferably, the thickness 1422 is chosen, relative to the refractive index and dimensions of nanostructures 1420, and the wavelengths of light for which destructive interference is desired, to provide destructive interference as noted above.

The antireflection coating 1430 may comprise an optically transmissive material having a refractive index lower than the refractive index of the nanostructures 1420, but higher than the refractive index of the medium or material directly overlying and forming an interface with the antireflective coating 1430. For example, the medium overlying and forming an interface with the antireflective coating 1430 may be air. In some embodiments, the antireflection coating 1430 may have a refractive index of from about 1.2 to about 2.0, from about 1.2 to about 1.7, from about 1.3 to about 1.6, or from about 1.4 to about 1.5. In some embodiments, the antireflection coating 1430 may have a refractive index of about 1.45. In some embodiments, the refractive index of the antireflection coating 1430 may also be lower than the refractive index of the substrate 1410. It will be appreciated that, in some embodiments, the lower refractive index of the antireflective coating 1430 relative to the substrate 1410 facilitates TIR of light within the substrate 1410, and the high refractive index of the antireflective coating 1430 relative to the medium overlying the coating 1430 facilitates the passage of light to the metasurface 1418 for incoupling into the substrate 1410.

With continued reference to FIG. 10, to reduce potential reflections caused by interfaces between additional materials, the antireflection coating 1430 may follow the contours of the nanostructures 1420 such that substantially no air or other material is present between the nanostructures 1420 and the antireflection coating 1430 for all of or substantially all of the area over which the metasurface is disposed. In some embodiments, as illustrated, the antireflection coating 1430 is disposed directly on the optical structure 1400 such that the antireflection coating 1430 encapsulates the nanostructures 1420 above the surface of the substrate 1410.

As discussed herein, the antireflection coating 1430 preferably comprises an optically transmissive material. As an example, the optically transmissive material may be an optically transmissive organic material, such as a transparent polymer. In some embodiments, the antireflection coating 1430 may comprise a resist material, such as a photoresist material. Nonlimiting examples of photoresist include positive resist and negative resist. In some embodiments, the antireflection coating 1430 may comprise UV photoresist, EUV photoresist, or DUV photoresist.

It will be appreciated that the antireflective coating 1430 may be formed on the nanostructures 1420 by various deposition processes. In some embodiments, the antireflection coating 1430 may be applied to the nanostructures 1420 as a liquid, whereby the liquid forms the antireflection coating 1430. For example, the antireflection coating 1430 may be deposited on the nanostructures 1420 as a liquid by spin-coating. In some embodiments, the antireflection coating 1430 may be deposited on the nanostructures 1420 using vapor phase precursors in a vapor deposition process, for example a chemical vapor deposition (CVD) process and atomic layer deposition (ALD).

In some embodiments, an antireflection coating 1430 may reduce the amount of incident light reflected by an optical structure 1400 operating in transmission mode by about 50%, 75%, 85%, 90%, 95%, 99%, or more compared to a substantially similar optical structure that does not comprise an antireflection coating 1430. In some embodiments, the antireflection coating may achieve such a reduction in reflected light over a range of incident angles from $-10°$ to $10°$, $-20°$ to $20°$, $-30°$ to $30°$, $-40°$ to $40°$, $-50°$ to $50°$, or wider.

The metasurface 1418 comprising a plurality of nanostructures 1420 may be configured to manipulate light, such as for beam steering, wavefront shaping, separating wavelengths and/or polarizations, and combining different wavelengths and/or polarizations. Preferably, the light is visible light having a wavelength in the range of 350 nm to 800 nm. In some embodiments, the metasurface over which an antireflection coating is disposed may comprise nanostructures having a size and periodicity less than the wavelength of the visible light. It will be appreciated that, in some embodiments, the metasurface 1418 selectively redirects some wavelengths of light, while allowing other wavelengths of light to pass without being redirected. Such properties are typically engineered with structures on micron scales (e.g., in photonics crystal fibers or distributed bragg reflectors), while various embodiments herein include geometries on nano-scales (e.g. 10-100× smaller scales), and provide selective redirection of light in the visible part of the electromagnetic spectrum.

As an example, the metasurface 1418 may work in a transmissive mode in which light is incident on the metasurface from a first side of the metasurface 1418, propagates through the body of the metasurface 1418, and subsequently propagates away from the metasurface 1418 on an opposite side of the metasurface 1418. The light propagates away from the metasurface 1418 in a direction different from the incident direction of the light on the first side. In some embodiments, an antireflection coating 1430 may reduce or eliminate the amount of light reflected from the metasurface 1418 as compared to a metasurface 1418 that does not comprise an antireflection coating 1430. In some embodiments, the antireflection coating 1430 may not substantially reduce or impact the amount of light that propagates through and away from the metasurface 1418 as compared to a metasurface 1418 that does not comprise an antireflection coating 1430.

In some embodiments, the substrate 1410 supporting the metasurfaces 1418 over which an antireflection coating 1430 is disposed may be a waveguide and may form direct view display devices or near-eye display devices, with the waveguides configured to receive input image information and generate an output image based on the input image information in the form of light encoded with image information. These devices may be wearable and constitute eyewear in some embodiments, and may be the display devices described herein with respect to FIGS. 1-9C. In some embodiments, the input image information received by the waveguides may be encoded in multiplexed light streams of different wavelengths (e.g., red, green and blue light) that are incoupled into one or more waveguides. Incoupled light may propagate through the waveguide due to total internal reflection. The incoupled light may be outcoupled (or outputted) from the waveguide by one or more outcoupling optical elements, as described above regarding FIGS. 9A-9C.

In some embodiments, the metasurfaces 1418 over which an antireflection coating 1430 is conformally disposed may be the incoupling optical elements, outcoupling optical elements, and/or light distributing elements of the waveguide. The compactness and planarity of the metasurface 1418 and antireflection coating 1430 allows for a compact waveguide, and for a compact stack of waveguides where multiple waveguides form a stack. In addition, the metasurface 1418 may be configured to provide for a high degree of precision in incoupling and/or outcoupling light, which may provide high image quality. For example, the high selectivity may reduce channel crosstalk in configurations in which full color images are formed by outputting light of different colors or wavelengths at the same time, while the antireflection coating 1430 may reduce ghost images.

It will be appreciated that the nanostructures 1420 may have various sizes and be arranged in various orientations relative to one another to form the metasurface 1418 for various applications. For example, as discussed herein, the nanostructures 1420 may be arranged to form a diffraction grating, such as asymmetric or an asymmetric diffraction grating. In some embodiments, the metasurface 1418 may be formed of nanostructures 1420 that are a multilevel or tiered. For example, the nanostructures 1420 may be relatively wide on a first level and relatively narrower on a second level. In some embodiments, the metasurfaces 1418 may be formed on a single level, and have a substantially constant width on that level. Examples of metasurfaces which may be utilized as the metasurface 1418 are described in: U.S. patent application Ser. No. 15/342,033, filed Nov. 2, 2016; U.S. Provisional Application No. 62/333,067, filed May 6, 2016; U.S. Provisional Application No. 62/451,608, entitled "DIFFRACTION GRATINGS FORMED BY METASURFACES HAVING DIFFERENTLY ORIENTED NANOBEAMS," filed on Jan. 27, 2017; and U.S. Provisional Application No. 62/451,615, entitled "DIFFRACTION GRATINGS BASED ON METASURFACES HAVING ASYMMETRIC OPTICAL ELEMENTS," filed on Jan. 27, 2017. Each of these applications is incorporated by reference herein. It will be appreciated that the nanostructures 1420 disclosed herein may correspond to the protrusions, nanobeams, etc. described in these applications. In some embodiments, the optical structure 1400 may be any metasurface comprising a plurality of nanostructures as is known in the art or developed in the future.

Examples of different configurations of the nanostructures 1420 are described below. It will be appreciated that, for clarity of description, the nanostructures discussed below may have different reference numerals than 1420. Nevertheless, it will be understood that the various nanostructures (1520, 1620) described below correspond to the nanostructures 1420 of FIG. 10.

Figure 11A:
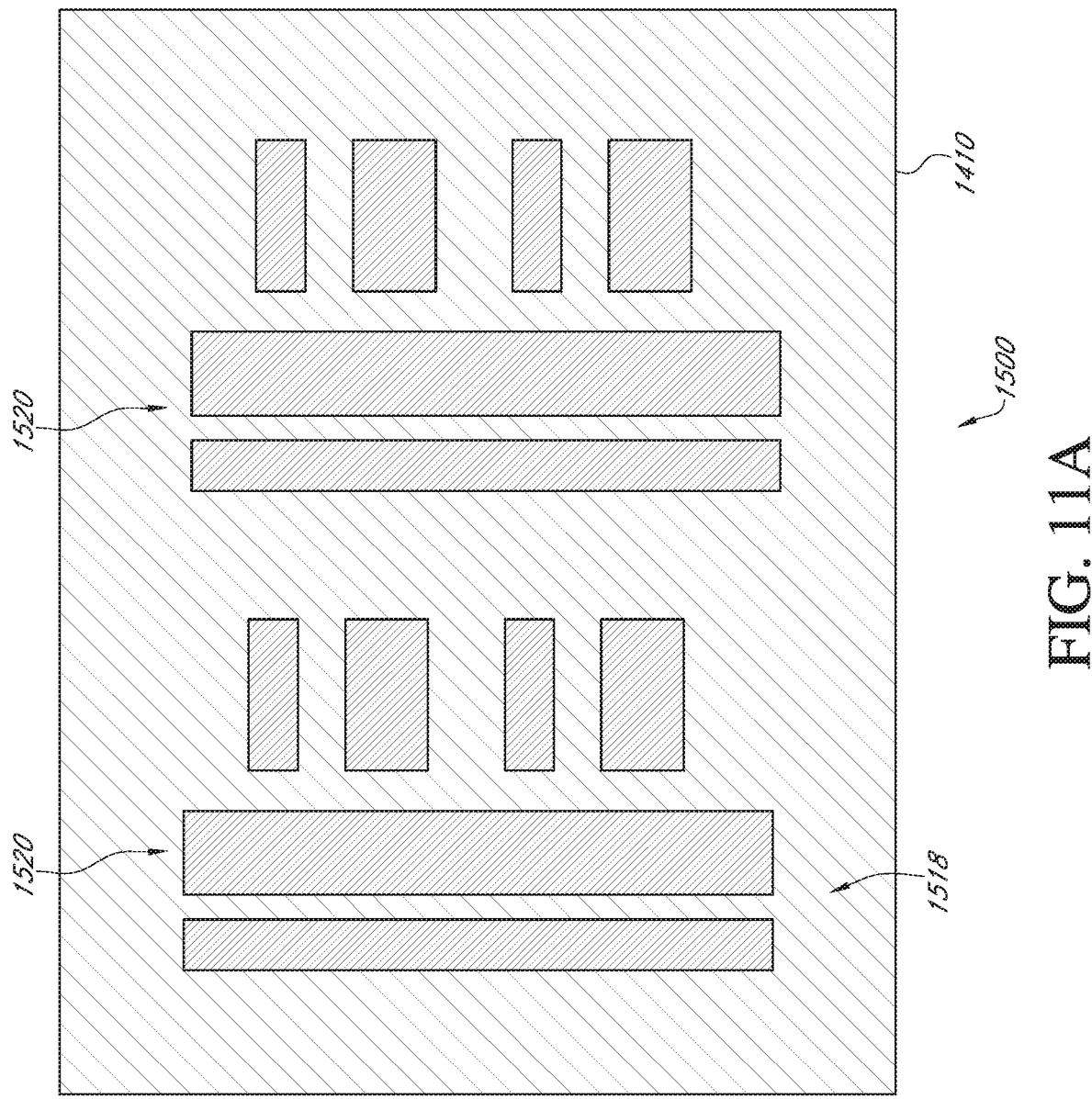
FIG. 11A illustrates a top-down view of an example metasurface comprising an asymmetric Pancharatnam-Berry Phase Optical Element (PBOE).

With reference now to FIG. 11A, and according to some embodiments, a top-down view is illustrated of an example optical structure 1500 comprising a metasurface 1518 comprising nanostructures 1520 forming an asymmetric Pancharatnam-Berry Phase Optical Element (PBOE), which may be advantageous for, among other things, light steering. The substrate 1410 underlies the nanostructures 1520. In some embodiments, the substrate 1410 may be an optically transmissive substrate, e.g., a waveguide.

Figure 11B:
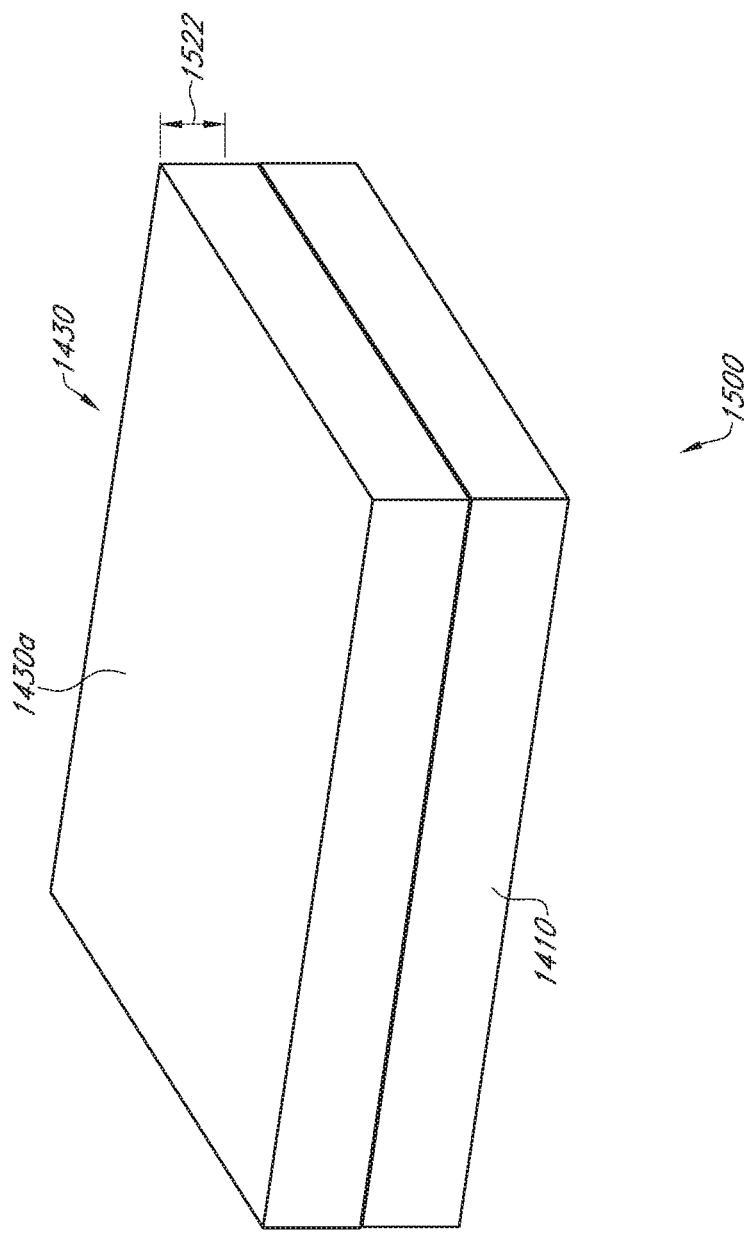
FIG. 11B illustrates a perspective view of the metasurface of FIG. 11A with an overlying antireflection coating.

With reference now to FIG. 11B, and according to some embodiments, a perspective view of an example optical element 1500 comprising an asymmetric Pancharatnam-Berry Phase Optical Element (PBOE) and including an antireflection coating 1430 is illustrated. As described herein, the antireflection coating 1430 follows the contours of the nanostructures 1520 such that substantially no air or other material is present between the nanostructures 1520 and the antireflection coating 1430. Further, as described herein, the antireflection coating 1430 may have a substantially flat top surface 1430a. The antireflection coating 1430 may function as a planarization layer for the underlying uneven topology of the nanostructures 1520. In some embodiments, the top surface 1430a of the antireflection coating 1430 may be substantially parallel to a generally horizontal plane defined by the top surfaces (not shown) of the nanostructures 1520. The thickness 1522 of the antireflection coating 1430 may be defined as the distance from the topmost surface of the nanostructures 1520 to the top surface 1430a of the antireflection coating 1430. In some embodiments, the thickness 1522 may be in a range from about 10 nm to about 2 microns. In some embodiments, the thickness 1522 may be from about 20 nm to about 1 micron. In some embodiments, the thickness 1522 may be from about 25 nm to about 500 nm, from about 30 nm to about 250 nm, from about 40 nm to about 100 nm, and from about 45 nm to about 55 nm. In some embodiments, the thickness 1522 may be about 50 nm. In some embodiments, the thickness 1522 may be chosen based upon the wavelength of light that the metasurface is configured to redirect and, thus, that is expected to impinge on the antireflection coating 1430. Preferably, the thickness 1522 is chosen to provide destructive interference between light reflected off the top and bottom surfaces, respectively, of the antireflection coating 1430, where the bottom surface (not shown) is the surface of the antireflection coating forming an interface with the top surface of the nanostructures 1520.

Figure 11C:
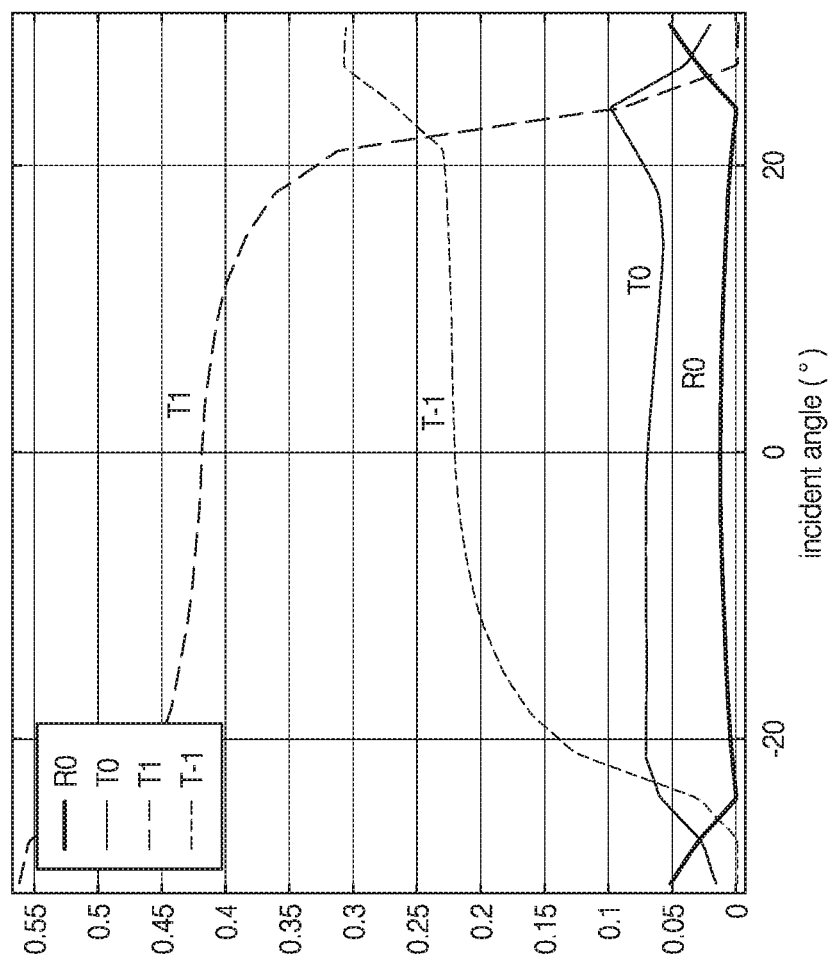
FIG. 11C is a plot of transmission and reflection as a function of the angle of incidence of light for an optical structure having the general structure shown in FIGS. 11A-11B.

FIG. 11C is a plot of transmission and reflection as a function of the angle of incidence of light for an optical structure having the general structure described with reference to FIGS. 11A-11B. Various orders of diffracted transmitted light are indicated by "T" and reflected light is indicated by "R." In this example, the antireflection coating 1430 is an optically transmissive photoresist having a refractive index of about 1.45, which is lower than the refractive index of the nanostructures 1520 and lower than the refractive index of the substrate 1410, which is about 1.77 and formed of polysilicon. The thickness 1522 of the antireflection coating 1430 is about 50 nm and air forms an interface with the topmost surface of the antireflection coating 1430.

As may be seen in the plot, the percentage of incident light reflected from the optical structure 1500 remains below about 2% over a wide range of incident angles, from more than −20° to more than 20°. In comparison, the percentage of light reflected from a substantially similar metasurface 1518 that does not comprise an antireflection coating was determined to be about 10% (not shown) over the same range of incident angles. Thus, in this embodiment, the antireflection coating 1430 provides an approximately 80% reduction in the amount of light reflected from the metasurface 1518 as compared to a substantially similar metasurface 1518 that does not comprise an antireflection coating 1430.

Meanwhile, the percentage of light incident on the metasurface 1518 comprising the antireflection coating 1430 that undergoes first order diffraction to angles suitable for TIR ($T_1$) is about 42% for an incident angle of 0°, and remains at about this level for incident angles from about −10° to about 10°. Advantageously, the amount of incident light diffracted at angles suitable for TIR is substantially the same as that for a substantially similar metasurface 1518 that does not comprise an antireflection coating 1430. Accordingly, a metasurface 1518 comprising an antireflection coating 1430 may be used as an optical element 1500 as described herein, for example an incoupling optical element, without a substantial reduction in the amount of incoupled light, while reducing the amount of reflected light, thereby reducing or eliminating potential ghost images in the display device in which the optical element is incorporated.

Figure 12A:
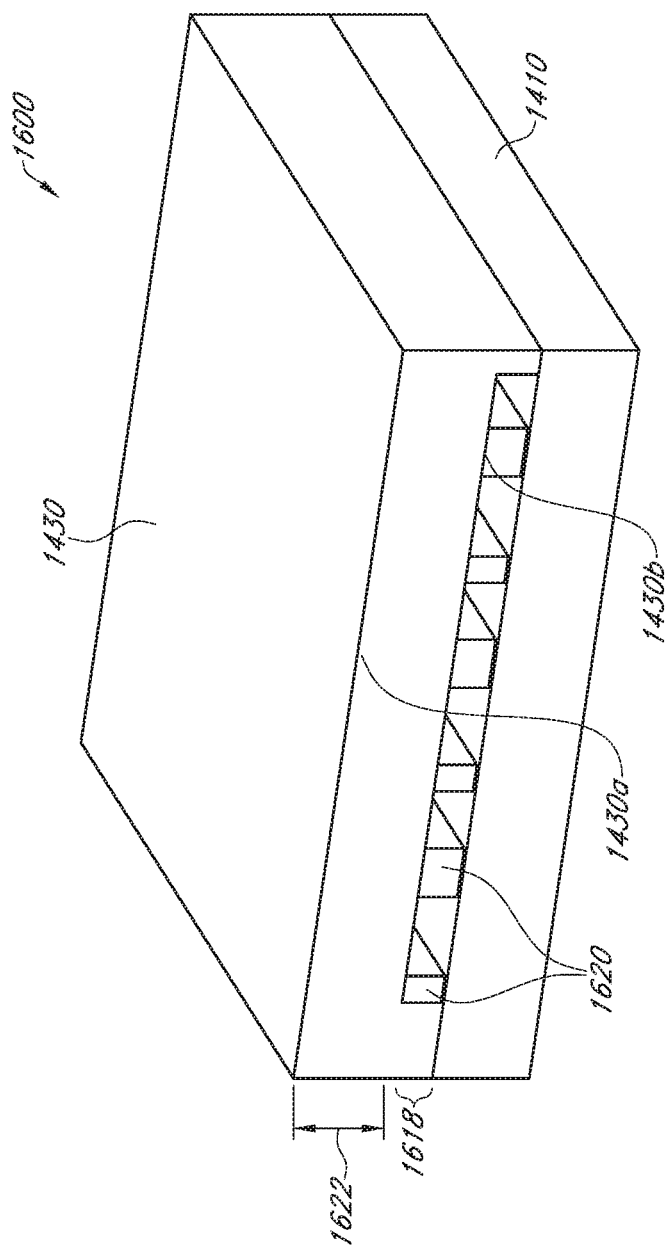
FIG. 12A illustrates a cross-sectional perspective view of an example metasurface comprising an asymmetric diffraction grating and an antireflection coating.
Figure 12B:
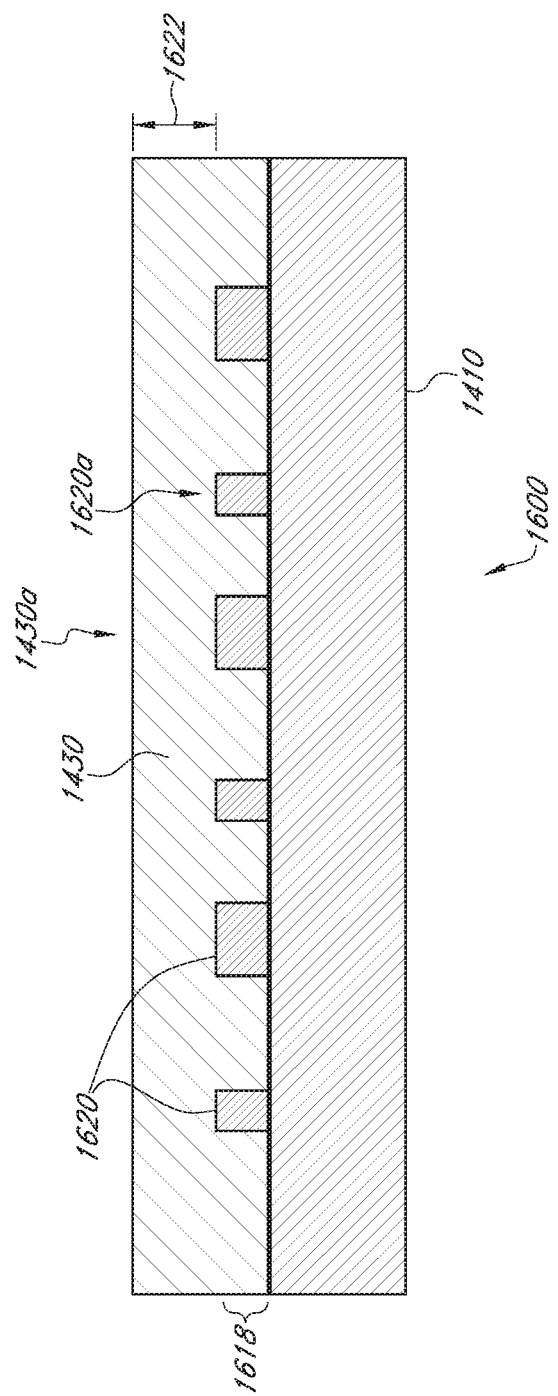
FIG. 12B illustrates a cross-sectional side view of the example metasurface and antireflection coating of FIG. 12.

With reference now to FIG. 12A, a cross-sectional perspective view of an example optical element 1600 comprising a metasurface 1618 and an antireflection coating 1430 is illustrated. The metasurface 1618 comprises an asymmetric diffraction grating formed by nano structures 1620 having different widths. FIG. 12B illustrates a cross-sectional side view of the optical element 1600 of FIG. 12A. In this example, the substrate 1410 comprises sapphire having a refractive index of about 1.77. The plurality of nanostructures 1620 comprises amorphous silicon. The antireflection coating 1430 may comprise an optically transmissive photoresist material having a refractive index of about 1.45, and in some embodiments, may be conformally applied to the asymmetric diffraction grating 1618 by spin-coating. The thickness 1622 of the antireflection coating 1430, that is the distance from the topmost surface 1620a of the nanostructures 1620 to the top surface 1430a of the antireflection coating 1430, is about 50 nm.

Figure 12C:
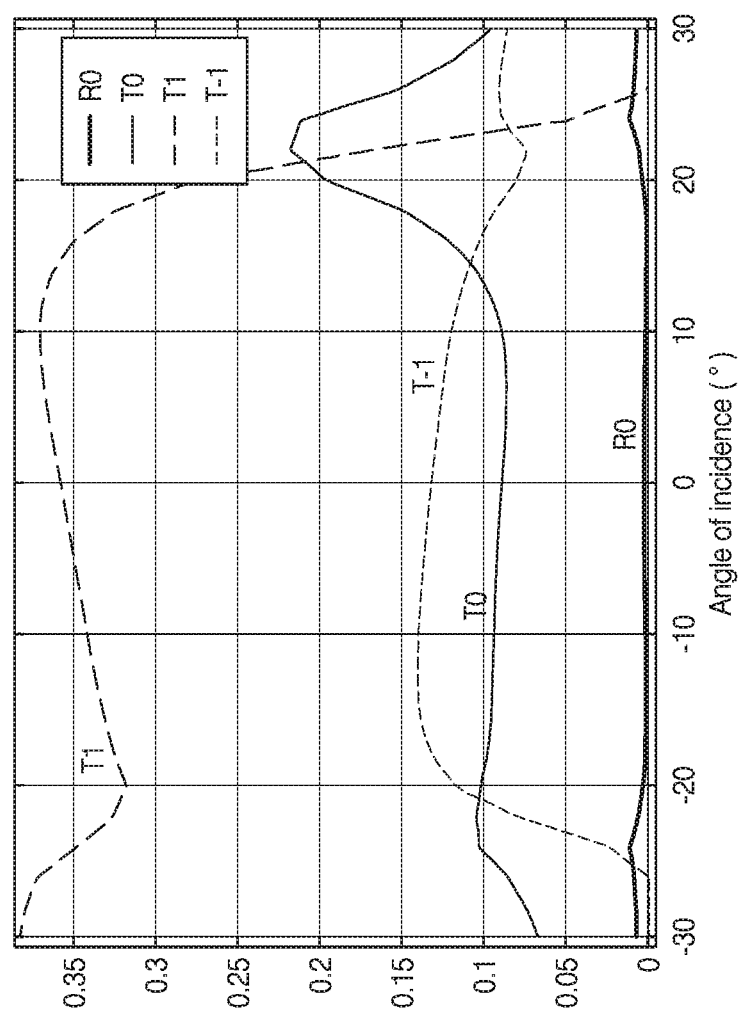
FIG. 12C is a plot of the transmission and reflection spectrum for the optical structure of FIGS. 12A-12B.

FIG. 12C is a plot of the transmission and reflection spectrum for an optical element having the general structure shown in FIGS. 12A-12B. As may be seen in the plot, the percentage of incident light reflected from the optical element 1600 comprising the antireflection coating 1430 remains below about 2% over a wide range of incident angles, from more than −30° to more than 30°. The percentage of light reflected from the optical element 1600 comprising the antireflection coating 1430 is about 0 for incident angles from about −15° to about 15°.

In comparison, the percentage of light reflected from a substantially similar optical element 1600 that does not comprise an antireflection coating 1430 is about 15% (not shown) over the same range of incident angles. Thus, in this embodiment, the antireflection coating 1430 provides an approximately 87% reduction in the amount of light reflected from the optical element 1600 as compared to a substantially similar optical element 1600 that does not comprise an antireflection coating 1430.

Meanwhile, the percentage of light incident to the optical element 1600 comprising the antireflection coating 1430 that undergoes first order diffraction to TIR (T1) is greater than about 30% for incident angles from about −30° to about 20°. Advantageously, the amount of incident light diffracted to TIR for the optical element 1600 comprising the antireflection coating 1430 is substantially the same as the amount of light diffracted to TIR for a substantially similar optical element 1600 that does not comprise an antireflection coating 1430. Accordingly, an optical element 1600 comprising an antireflection coating 1430 may be used as an optical element as described herein, for example an incoupling optical element, without a substantial reduction in the amount of incoupled light, while reducing the amount of reflected light, thereby reducing or eliminating potential ghost images, as discussed herein.

It will be appreciated that the metal surfaces and nanostructures disclosed herein may be formed by patterning, such as patterning by lithography and etching. In some embodiments, the metasurfaces and nanostructures may be patterned using nanoimprinting, thereby avoiding costly lithography and etch processes. Once the nanostructures are patterned, any masking materials may be removed in some embodiments and an antireflection coating 1430 may be applied, deposited, or formed over the metasurface, as described herein. In some other embodiments, the masking materials themselves may be utilized as the antireflective coating. FIGS. 13A-13D and FIGS. 14A-14D illustrate examples of process flows for forming optical structures having antireflection coatings.

FIGS. 13A-13D illustrate cross-sectional views of intermediate structures 1700A-1700D, respectively, at various stages of fabrication of an optical element 1400, 1500 1600 having a metasurface 1418, 1518, 1618 using lithography and etch, according to some embodiments. Referring to the intermediate structure 1700A of FIG. 13A, the method includes providing a substrate 1410 having a surface 1410S suitable for forming a metasurface 1418, 1518, 1618 thereon. The substrate 1410 includes an optically transmissive material having a refractive index $n_2$ and various other material attributes described above with reference to FIG. 10. The method additionally includes forming on the surface 1410S a high index layer 1411 having an index of refraction $n_{1\ bulk}$. The high index layer 1411 is suitable, when patterned, for forming the one or more nanostructure 1420, 1520, 1620, as described above with reference to FIGS. 10-12. The high index layer 1411 may be deposited using any suitable technique, such as chemical vapor deposition (CVD), including plasma-based CVD processes, such as plasma-enhanced chemical vapor deposition (PECVD) and thermal-based CVD processes, such as low pressure chemical vapor deposition (LPCVD), according to some embodiments. The high index layer 1411 may also be deposited using physical vapor deposition (PVD), evaporation, and atomic layer deposition, among other techniques. The method additionally includes forming on the high index layer 1411 a masking layer 1431A. The masking layer 1431A may be formed of or include one or more layers of materials that are suitable for providing a template for subsequent etching of the underlying high index layer 1411. In some embodiments, the masking layer 1431A may be a photoresist, which may be spin-coated, followed by a post-bake. In some other embodiments, the masking layer 1431A may include a plurality of layers, including a hard mask layer formed on the high index layer 1411 and a photoresist layer formed on the hard mask layer. The hard mask layer may be included, for example, when a photoresist layer may not provide sufficient etch selectivity during the subsequent etch pattern transfer to the underlying high index layer 1411. The hard mask layer may also serve as an antireflective coating to minimize reflection during the subsequent exposure process. In some embodiments, the hard mask layer may be a spin-coated polymer or a film deposited by any of the deposition techniques for depositing the high index layer 1411. When included, the hard mask layer may provide greater etch selectivity than the overlying photoresist layer. In some embodiments, the photoresist may be a positive photoresist or a negative photoresist. A positive photoresist is a type of photoresist in which the portion of the photoresist that is exposed to light becomes soluble to the photoresist developer, whereas a negative resist is a type of photoresist in which the portion of the photoresist that is exposed to light becomes insoluble to the photoresist developer.

In some embodiments, the photoresist and/or the hard mask layer may be formed of a material containing silicon or silicon oxide, which may have sufficient etch selectivity against the high index layer 1411, such that the photoresist and/or the hard mask layer remains relatively intact through the etching of the underlying high-index layer 1411. In these embodiments, the silicon or silicon oxide-containing photoresist and/or hard mask layer may remain on top of one or more nanostructures 1420, 1520, 1620 after patterning, as described above with reference to FIGS. 10-12.

Figure 13A:
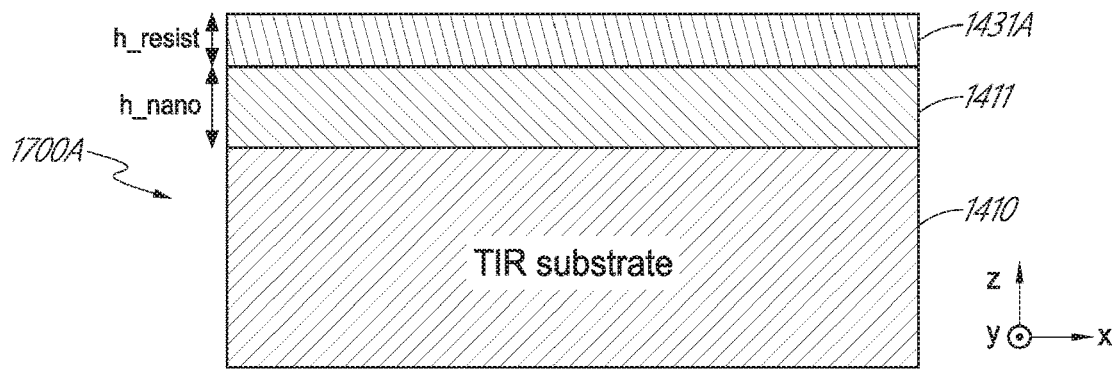
FIGS. 13A-13D are cross-sectional views of intermediate structures at various stages of fabrication of an example optical structure comprising a metasurface, according to some embodiments.
Figure 13B:
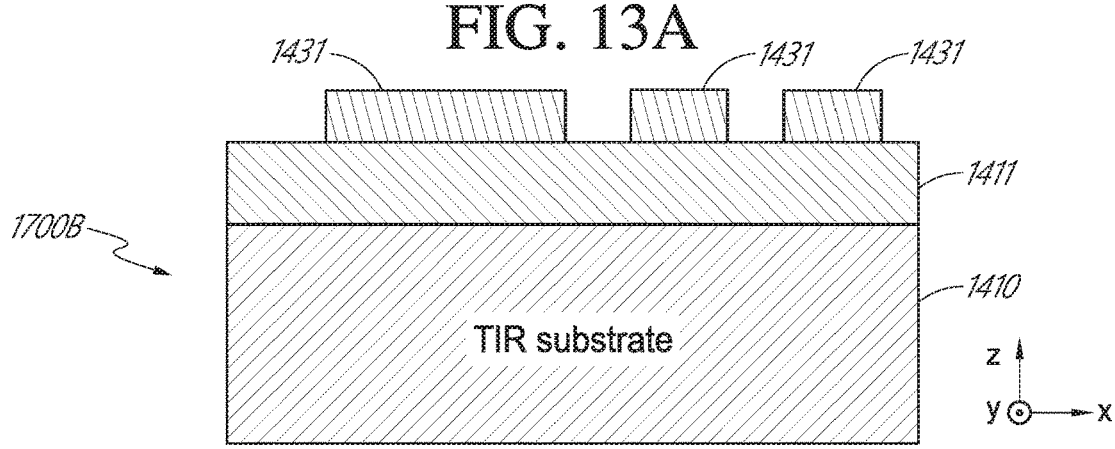

Referring to the intermediate structure 1700B of FIG. 13B, after deposition and post-deposition bake, the method includes patterning the photoresist layer of the mask layer 1431 by selectively exposing portions of the photoresist to a pattern of light. The exposure to light, e.g., coherent UV light, or an electron beam, causes a chemical change, e.g., polymeric crosslinking in the photoresist, which allows exposed portions of the photoresist to be selectively removed by a developer solution for a positive photoresist, or allows unexposed portions of the photoresist to be selectively removed by a developer solution for a negative photoresist. Upon selectively removing, the resulting patterned masking photoresist remains on the high index layer 1411, thereby serving as a template for the subsequent patterning the underlying hard mask layer when included by, e.g., etching. The resulting intermediate structure 1700C shows the patterned masking layer 1411, which includes the patterned photoresist and optionally the patterned hard mask layer when included.

Figure 13C:
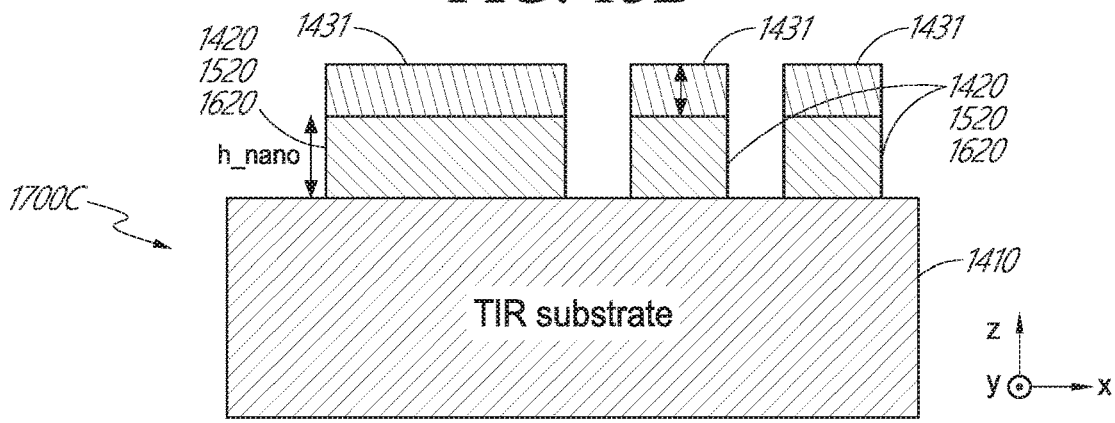
Figure 13D:
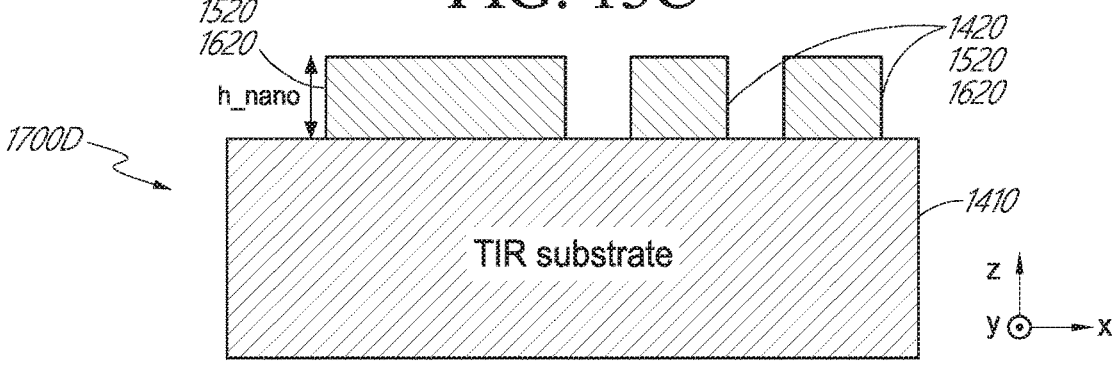

Referring to the intermediate structure 1700C of FIG. 13C, the patterned masking layer 1431 may be used as a template to etch the underlying high index layer 1411 into one or more nanostructures 1420, 1520, 1620. It will be appreciated that the nanostructures 1420, 1520, 1620 may be configured as desired based on the desired properties of the resulting meta-surface. In some embodiments, the nanostructures 1420, 1520, 1620 may include features extending in a first lateral direction (e.g., the y-direction) and a plurality of second nanostructures 1420, 1520, 1620 extending in a second direction (e.g., the x-direction), as described more in detail above with reference to FIGS. 10-12. In various embodiments, the high index layer 1411 may be etched, e.g., anisotropically dry-etched. The etch process employed may have a suitable selectivity against the masking layer 1431 and/or the substrate 1410, such that the portions of the high index layer 1411 are removed without prematurely removing the masking layer 1431 and/or without undesirably damaging the exposes portions of the substrate 1410.

Referring to the intermediate structure 1700D, in some embodiments, the masking layer 1431 on the one or more nanostructures 1420, 1520, 1620 are removed therefrom. The resist portion of the masking layer 1431 may be removed by, e.g., using a liquid resist stripper or an oxygen-based plasma in a process referred to as ashing. If desired and when included, the underlying hard mask layer may be subsequently removed using a wet or a dry etch process which selectively removes the hard mask without substantially affecting the one or more nanostructures 1420, 1520, 1620 or the substrate 1410. Subsequently, an antireflective coating may be deposited on and at the sides of the nanostructures 1420, 1520, 1620, e.g. by spin-coating or by chemical vapor deposition and subsequent planarization of the vapor deposited layer.

In some other embodiments, e.g., the embodiments described above with reference to FIGS. 10-12, the mask layer 1431, e.g., the photoresist/hard mask or the hard mask, may be left-in without being removed. In these embodiments the mask layer 1431 may comprise the anti-reflection coating 1430 as described herein with reference to FIGS. 10-12

Figure 14A:
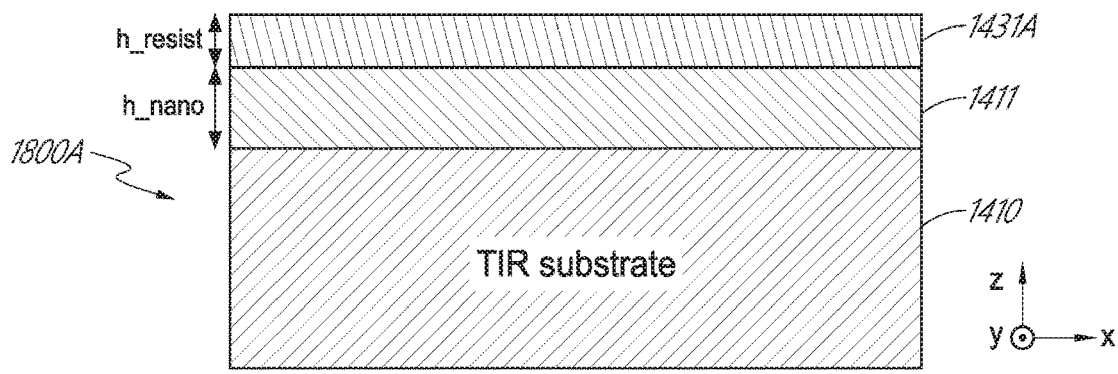
FIGS. 14A-14D are cross-sectional views of intermediate structures at various stages of fabrication of an example optical element comprising a metasurface, according to some other embodiments.
Figure 14B:
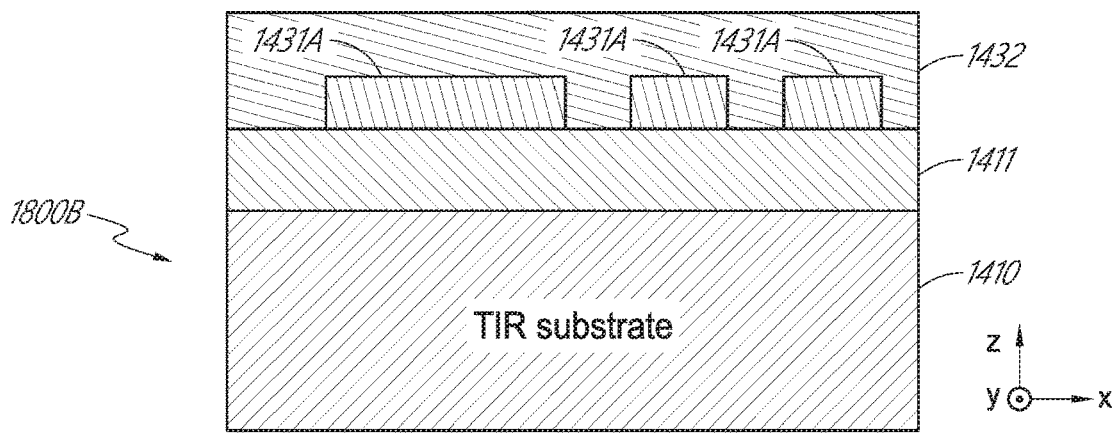
Figure 14C:
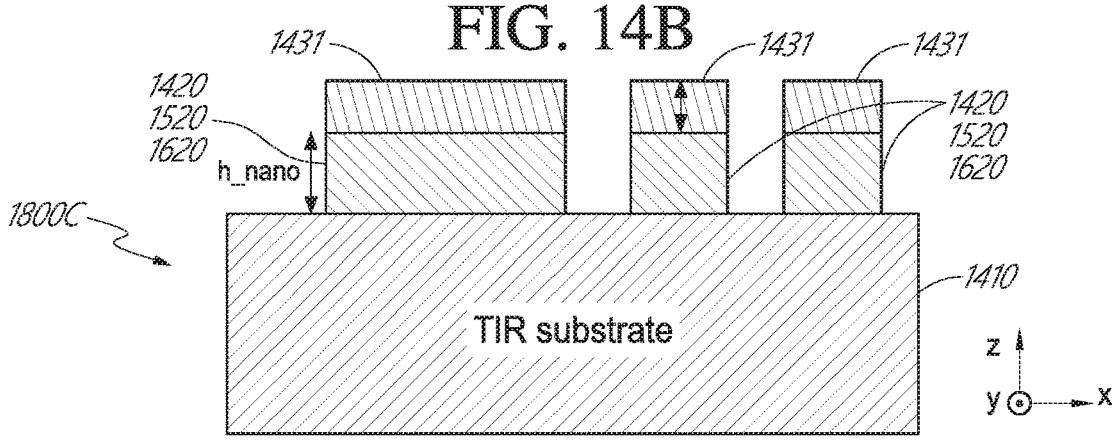
Figure 14D:
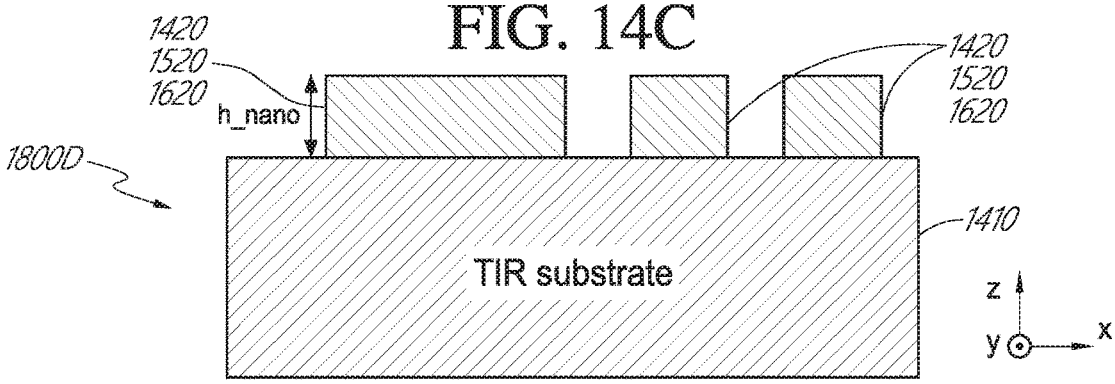

FIGS. 14A-14D illustrate cross-sectional views of intermediate structures 1800A-1800D, respectively, at various stages of fabrication of an optical element 1400, 1500, 1600 having a metasurface 1418, 1518, 1618 according to some embodiments. In some embodiments, the method of forming intermediate structures 1800A, 1800C and 1800D of FIGS. 14A, 14C and 14D, respectively, is similar to the method of forming intermediate structures 1700A, 1700C and 1700D of FIGS. 13A, 13C and 13D, respectively. However, the method of forming the intermediate structure 1800B of FIG. 14B is different from the method forming the intermediate structure 1700B of FIG. 13B, whose differences are described below.

Referring to the intermediate structure 1800B of FIG. 14B, unlike the method described above with reference to FIG. 13B, instead of patterning a photoresist layer by selectively exposing and removing portions of the photoresist using light or an electron beam, in the illustrated embodiment, a nanoimprint template 1432, or a nanoimprint mold, which has predefined topological patterns in accordance with formation of the one or more nanostructure 1420, 1520, 1620, is brought into contact with an imprint resist of the masking layer 1431A. In some embodiments, the template 1432 is pressed into an imprint resist formed of thermoplastic polymer under certain temperature, e.g., above the glass transition temperature of the imprint resist, thereby transferring the pattern of the template 1432 into the softened imprint resist. After being cooled down, the template 1432 is separated from the imprint resist and the patterned resist is left on the high index layer 1411. In some other embodiments, the after being pressed into the imprint resist, the imprint resist is hardened by crosslinking under UV light.

Figure 15:
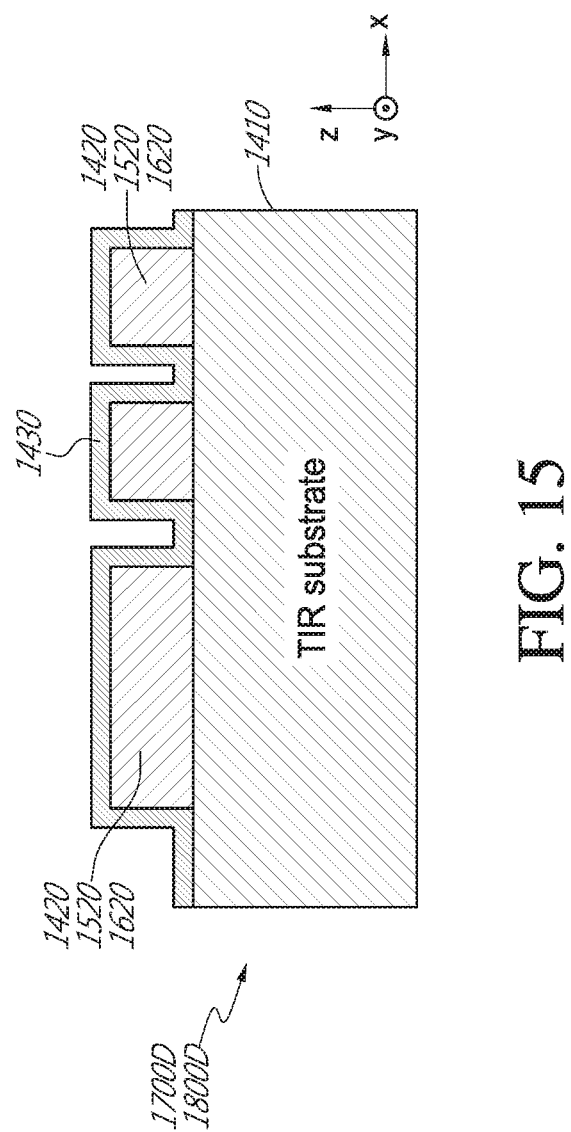
FIG. 15 illustrates a cross-sectional side view of a metasurface having a conformal antireflection coating.

Referring to FIG. 15, and according to some embodiments, after removal of masking layer 1431 from the one or more nanostructures 1420, 1520, 1620 as described above with respect to FIGS. 13D and 14D, an antireflective coating 1430 may be conformally deposited on the nanostructures 1420, 1520, 1620, e.g. by a vapor deposition process such as a chemical vapor deposition process or atomic layer deposition process. Thus, in some embodiments, the deposited antireflective coating 1430 may a conformal layer overlying the nanostructures 1420, 1520, 1620, and following contours of the nanostructures 1420, 1520, 1620, without completely filling the volume separating those nanostructures.

In the foregoing specification, various specific embodiments have been described. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A display system comprising:
   a waveguide assembly for receiving and outputting image light having image content, the waveguide assembly comprising a stack of waveguides, each waveguide comprising:
   an optically transmissive substrate;
   an incoupling optical element comprising a metasurface overlying the substrate, the metasurface comprising a plurality of nanostructures forming repeating unit cells, wherein, as seen in a top-down view, each unit cell comprises:
      a plurality of first nanostructures having first lengths and first widths, wherein the first lengths are elongated in a first direction, and wherein the first widths differ from one another; and
      a plurality of second nanostructures having second lengths and second widths, wherein the second lengths are elongated in a second direction, and wherein the second widths differ from one another,
      wherein the second direction crosses the first direction; and
   an antireflection coating comprising a layer of an optically transparent material conformally disposed over the nanostructures of the metasurface, wherein the optically transparent material has a refractive index less than a refractive index of the nanostructures, wherein the layer of the optically transparent material follows contours of the nanostructures without completely filling volumes separating each of the nanostructures such that a top surface of each waveguide is non-planar, and wherein the unfilled volumes that separate the first nanostructures from the second nanostructures are of a different volume from the unfilled volumes that separate the first nanostructures or that separate the second nanostructures; and
   an image injection device configured to direct the image light into each waveguide of the waveguide assembly via the metasurface of each incoupling optical element,
   wherein the antireflection coating has a thickness configured to provide destructive interference between image light reflecting off a top surface of the antireflection coating and image light reflecting off a bottom surface of the antireflection coating,
   wherein, as seen in the top-down view, incoupling optical elements of different ones of the waveguides are laterally offset from one another.

2. The display system of claim 1, wherein the metasurface comprises a diffraction grating.

3. The display system of claim 2, wherein the metasurface comprises an asymmetric diffraction grating.

4. The display system of claim 1, wherein the metasurface comprises a Pancharatnam-Berry phase optical element (PBOE).

5. The display system of claim 1, wherein the metasurface comprises multi-tier nanostructures.

6. The display system of claim 1, wherein the optically transparent material comprises a polymer.

7. The display system of claim 6, wherein the optically transparent material comprises photoresist.

8. The display system of claim 1, wherein the optically transparent material has a refractive index from about 1.2 to about 2.

9. The display system of claim 1, wherein a distance from a topmost surface of the nanostructures to a topmost surface of the antireflection coating is from about 10 nm to about 1 micron.

10. The display system of claim 9, wherein a distance from a topmost surface of the nanostructures to a topmost surface of the antireflection coating is from about 30 nm to about 250 nm.

* * * * *